United States Patent
Sakamaki et al.

(10) Patent No.: US 6,658,410 B1
(45) Date of Patent: Dec. 2, 2003

(54) SYSTEM AND METHOD FOR INTERMEDIATING INFORMATION

(75) Inventors: Katsuya Sakamaki, Tokyo (JP); Shingo Omata, Tokyo (JP); Kazuhiko Wakui, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 303 days.

(21) Appl. No.: 09/679,223

(22) Filed: Oct. 4, 2000

(30) Foreign Application Priority Data

Mar. 23, 2000 (JP) ........................................ 2000-082673
Sep. 11, 2000 (JP) ........................................ 2000-274259

(51) Int. Cl.[7] .......................... G06F 17/30; G06F 15/16; G09G 5/00
(52) U.S. Cl. ........................... 707/4; 709/200; 345/700; 345/701
(58) Field of Search ................................. 707/1–4, 102, 707/104.1, 500–501.1, 513, 526; 709/200–203; 715/500–501.1, 513, 526; 705/64, 402–403; 345/700–701, 811

(56) References Cited

U.S. PATENT DOCUMENTS 6,061,681 A * 5/2000 Collins ..................... 379/88.13
6,249,282 B1 * 6/2001 Sutcliffe et al. ............ 345/751

FOREIGN PATENT DOCUMENTS

| JP | 06-019926 | 1/1994 |
|---|---|---|
| JP | 09-179910 | 7/1997 |
| JP | 3052673 | 7/1998 |
| JP | 10-198518 | 7/1998 |
| JP | 10-232893 | 9/1998 |
| JP | 10-290259 | 10/1998 |
| JP | 11-096229 | 4/1999 |
| JP | 11-194985 | 7/1999 |

* cited by examiner

Primary Examiner—Alford Kindred
(74) Attorney, Agent, or Firm—Frishauf, Holtz, Goodman & Chick, P.C.

(57) ABSTRACT

A system extracts a member who matches with search option given by a target member who searches the other members. The target member is informed of URL indicating an open profile web page of the extracted member. The target member refers to the open profile of the introduced member, and sends a message to the introduced member. The target member is charged for the message transmission if the target member sends the message to the introduced member concerned first time. The introduction member refers to the message posted to his/her bulletin board, and refers to an open profile of the message sender. If the introduced member decides to send a reply to the target member after referring to the message and the open profile, the introduced member post a message to a bulletin board of the target member. The introduced member is not charged for the reply transmission.

3 Claims, 26 Drawing Sheets

FIG.5

OPEN PROFILE DATABASE 11

| MEMBER ACCOUNT | ONLINE ID | GENDER | AGE | LOCATION | INTERESTS | COMMENTS | URL FOR BBS | IMAGE |
|---|---|---|---|---|---|---|---|---|
| AAA0001 | HANAKO | F | ... | TOKYO | READING, MUSIC, COOKING... | I LOVE COOKING, AND ... | http://abc.ne.jp/~hanakoAAA0001/bbs.html | ... |
| AAA0002 | TARO | M | 22 | KANAGAWA | GAME, MUSIC, READING... | I WANT TO BE A WRITER OF CARTOON MOVIE... | http://abc.ne.jp/~taroAAA0002/bbs.html | ... |
| ... | ... | ... | ... | ... | | ... | ... | ... |

PERSONAL INFO. DATABASE 14

| MEMBER ACCOUNT | PERSONAL DATA | | | | | | SEARCH OPTION | | |
| --- | --- | --- | --- | --- | --- | --- | --- | --- | --- |
| | REAL NAME | ONLINE ID | PASSWORD | GENDER | BIRTH DATE | LOCATION | GENDER | AGE | INTERESTS |
| AAA0001 | HANAKO SUZUKI | HANAKO | ktyyf234 | F | 19770425 | ...MINATO-KU, TOKYO 106-0062 | --- | 20-29 | 1 OR MORE MATCHES |
| AAA0002 | TARO YAMADA | TARO | 1010boja | M | 19750611 | ...KAMAKURA-SHI, KANAGAWA 248-0014 | F | 10-29 | 2 OR MORE MATCHES |
| ... | ... | ... | ... | ... | ... | ... | ... | ... | ... |

FIG.6A

DETAILED PERSONAL PROFILE DATABASE 15 (FOR SEARCHING)

| MEMBER ACCOUNT | ONLINE ID | GENDER | AGE | INTERESTS | URL FOR OPEN PROFILE PAGE | INTRODUCED MEMBER'S ACCOUNT |
|---|---|---|---|---|---|---|
| AAA0001 | HANAKO | F | 20 | READING, MUSIC, COOKING... | http://abc.ne.jp/~hanakoAAA0001/prof.html | AAA0002:ACD0226:BUG8473... |
| AAA0002 | TARO | M | 22 | GAME, MUSIC, READING... | http://abc.ne.jp/~taroAAA0002/prof.html | AAA0001:GRM5835:WOF2981... |
| ... | ... | ... | ... | ... | ... | ... |

FIG.6B

PERSONAL TOP PAGE DATABASE 16

| MEMBER ACCOUNT | LINKED INTRODUCTION MEMBER INFO. | | | BBS MANAGEMENT INFO. |
| --- | --- | --- | --- | --- |
| | INTRODUCTION MEMBER'S ACCOUNT | ONLINE ID | URL FOR PERSONAL PROFILE PAGE | BBS POSTING FLAG |
| AAA0001 | ABC1205 | JIRO | http://abc.ne.jp/~jiroABC1205/prof.html | 0 |
| AAA0001 | MNP1200 | SEIKO | http://abc.ne.jp/~seikoMNP1200/prof.html | 0 |
| AAA0002 | AAA0001 | HANAKO | http://abc.ne.jp/~hanakoAAA0001/prof.html | 1 |
| ... | | | ... | ... |

FIG.6C

PERSONAL BBS DATABASE 18

| MEMBER ACCOUNT | ONLINE ID | PASSWORD | MESSAGE | | | |
|---|---|---|---|---|---|---|
| | | | 1 | 2 | ...... | 50 |
| AAA0001 | HANAKO | ktyyf234 | HELLO... | LONG TIME NO SEE | ...... | |
| AAA0002 | TARO | 1010boja | HOW DO YOU DO ? | GOOD EVENING | ...... | |
| ... | ... | ... | ... | ... | ...... | |

FIG.7

CHARGE INFO. DATABASE 20

| MEMBER ACCOUNT | CHARGE COUNTER | CHARGE MEMBER'S ACCOUNTS |
|---|---|---|
| AAA0001 | 2 | AAA0002,ACD0226,BUG8437... |
| AAA0002 | 3 | AAA001,GRM5384,WOF2981... |
| ... | ... | ... |

INTRODUCTION PAGE FOR TARO

HELLO TARO !
TODAY'S INTRODUCTION(S) : 1

---

HANAKO

YOU CAN SEE HIS/HER PROFILE BY CLICKING
HIS/HER NAME ABOVE

HANAKO'S PROFILE

ONLINE ID: HANAKO
LOCATION : TOKYO
AGE : -----
INTERESTS : READING, LISTENING TO MUSIC, COOKING
COMMENTS : HELLO, I'M HANAKO.
I LOVE COOKING, SO I WANT TO BE A WRITER
OF COOKING BOOKS IN THE FUTURE.
IF YOU ARE INTERESTED IN WRITING,
CONTACT ME AND TALK ABOUT IT.

POST

FIG.11

MESSAGE TO HANAKO

SUBJECT  HOW ARE YOU ?

NAME  TARO

MESSAGE

THIS IS A MESSAGE REFERRING TO YOUR PROFILE.
WHAT I AM AFTER IS A WRITER, TOO. |

CANCEL                    POST

FIG.12

YOU WILL BE CHARGED AFTER TRANSMISSION.
DO YOU AGREE ?

YES                    NO

FIG.13

INTRODUCTION LIST

HELLO, HANAKO !
TODAY'S INTRODUCTION(S) : 2

MESSAGE(S) AVAILABLE

JIRO
SEIKO

YOU CAN SEE HIS/HER PROFILE BY CLICKING HIS/HER NAME ABOVE

FIG.14

HANAKO'S BULLETIN BOARD

01.26 22:48  TARO

HOW ARE YOU ?

THIS IS A MESSAGE REFERRING TO YOUR PROFILE. WHAT I AM AFTER IS A WRITER, TOO. I WANT BE WRITER OF CARTOON MOVIES. I HOPE WE CAN PROMOTE GOOD FELLOWSHIP BECAUSE WE HAVE THE SAME DREAM: PROFESSIONAL WRITER. COME AND JOIN MY BBS.

POST

FIG.15

TARO'S PROFILE

ONLINE ID : TARO
LOCATION : KANAGAWA PREFECTURE
AGE : 22
INTERESTS : GAME, LISTENING TO MUSIC, READING
COMMENTS : THIS IS TARO, AND I WANT TO BE A GAME PROGRAMMER. SO, CONTACT ME BY E-MAIL IF YOU ARE INTERESTED IN CARTOON MOVIES AND VIDEO GAMES.

POST

FIG.16

MESSAGE TO TARO

SUBJECT | HELLO
NAME | HANAKO

MESSAGE

HI, THIS IS HANAKO.
YOU ARE THE FIRST RESPONDENT WHO WANTS TO BE A WRITER.

CANCEL     POST

FIG.17

SYSTEM AND METHOD FOR INTERMEDIATING INFORMATION

BACKGROUND OF THE INVENTION

1. Field of the Invention

The present invention relates to a system of information exchanging services which provides opportunities for establishing one-to-one communication while using a network system such as the internet.

2. Description of the Related Art

Various text information, image information and sound information are available through the internet from many web sites on the World Wide Web (WWW). The Bulletin Board System (BBS) has been a major method for finding persons on the internet.

Since messages posted to the BBS are open communications, anyone can browse them. This is a demerit for some users who do not want to open personal information to public inspection. Moreover, it is difficult to find people when searching by interests.

There are some member directory sites which require user charges. Most of those sites, for example, charge users for the service by monthly payment. Therefore, the users are charged even if they can not find persons who match their criteria.

SUMMARY OF THE INVENTION

The present invention has been made in consideration of the above, and it is an object of the present invention to provide users with opportunities for easily finding matched folks for establishing communications.

It is another object of the present invention to provide users opportunities for establishing one-to-one communication with others through a network, while providing mated users with easy usability.

The present invention further relates to communication through a network, it is a further object of the present invention to provide a reasonable charging method.

To achieve the above objects, a method for intermediating information according to a first aspect of the present invention is a method for intermediating information comprises:

registering attribute information of a plurality of members at a database;

extracting members to be introduced to another member based on the attribute information registered at the database;

introducing the extracted members to a target member who searches other members, via a network; and intermediating information between the target member and the introduced members via the network.

According to the above structure, a member can find appropriate introduction members because the introduction members are extracted based on the members' attribute information. The target member and the introduced member can exchange messages one-to-one between them.

The members may be charged for information transfer. In this case, since the member is charged not for introduction but for transferring information, the member can choose variable introduction.

The members may be charged when the target member transmits information to the introduced members first time, or a member transmits a reply to received information. If the user is charged each time he/she transmits information, the user tends to reduce the number of information transmissions. According to the above structure, the user is charged only when the target member transfers information to the introduction member first time, or only when the introduction member transfers reply information to the target member. In this structure, the members are not charged for transferring information second time and after. The users keep their motivation for continued communications.

The attribute information may include information representing characteristics of the members and search options In this case, members whose characteristics match with the search option of the target member may be introduced to the target member.

The extracting members and the introducing members may be repeatedly executed at predetermined timings such as every predetermined cycle or every predetermined time. Or they may be executed in response to a request given by a member.

The extracted members may be limited to the predetermined number by using, for example, random numbers, in a case where the large number of the members are extracted.

Predetermined information of the member may be open to the public in form of, for example, web pages so that other members can refer to the opened information. According to this structure, the member can refer to information of the introduced member, and can decide whether transfer information to the introduced member, in other words, establish communication between the introduced member or not.

Information may be exchanged via electronic bulletin boards prepared for each member. In this case, the member may be charged for posting a message to the bulletin board of the introduced member. Since only the members are allowed to access the bulletin boards, information exchanged among the members is not leaked to public BBS on the net, thus, the member's privacy will be protected.

The member (for example, member A) who is going to post a message to a bulletin board of other member (for example member B) is noticed that the member A will be charged after the message is posted, and the member A is allowed to post the message to the bulletin board when the member A agrees with the notice. According to this structure, the user is noticed when he/she is charged, therefore, the users can use the system with making their decisions whether they enjoy pay service or not.

The members may be allowed to exchange information via bulletin boards prepared for each member. And, a member (member A) posts a message to the bulletin board of the introduced member (member B), and the member B may be charged when posting a reply to the bulletin board of the member A.

In this case, the member (member B) who receives a message from other member through the bulletin board and is going to post a reply to the received message posted by the member A, may be noticed that the member B will be charged after the reply is posted, and the member B may be allowed to post the reply when the member agrees the notice.

The members may be extracted except members who have been introduce to the target member before and/or members to whom the target member has been introduced before.

A web page on which a list of the extracted introductions and a message arrival indicator item (including, icon, button, hypertext, pull-down menu, etc.) representing that messages by other members have arrived are arranged may be provided to each member; a web page showing profile data of the introduction may be presented to the target member in response to selecting the introduction from the list; and messages may be presented to the target member in response to selecting the message arrival indicator item.

The web page showing the profile data may have a request transmission item for transmitting a request for transmitting messages to other members; a form page for inputting and transmitting a message to other member may be provided to the target member in response to selecting the request transmission item; and the target member may be charged when the target member transmits a message to another member, or when the target member receives reply from other member to the target member.

To achieve the above objects, a system for intermediating messages according to a second aspect of the present invention comprises:

a database which stores attribute information of a plurality of members;

a member extraction unit which extracts members to be introduced to another member based on the attribute information stored in the database;

a member introducing unit which introduces the member extracted by the member extraction unit to a target member who has searched other members; and an intermediate unit which intermediates messages between the target member and the introduced member.

According to this structure, a member can find appropriate introduction members because the member extraction unit extracts the introduction members based on the members' attribute information. The target member and the introduced member can exchange messages one-to-one between them.

Further, the user may be charged for message intermediate by the intermediate unit. In this case, since the user is not charged for introducing but for information transfer, the member can choose variable introduction.

The intermediate may comprise:

an electronic bulletin board storage unit which stores electronic bulletin boards prepared for each member;

a posting unit which posts a message to the bulletin board of the member introduced by the member introducing unit in response to a request from the target member; and a message presenting unit which presents the message posted to the bulletin board of the introduced member in response to a request from the member concerned.

The system may comprise open information storage unit for storing opened information of the members; information read unit which reads out the open information of the introduced member from the open information storage unit, and presents the read-out information to the target member in response to a request from the target member; a message posting unit which posts a message to the bulletin board of a member introduced to the target member who refers to the presented open information in response to a request from the target member, and a message presenting unit which presents the message posted to the bulletin board of the introduced member in response to a request from the member concerned.

The system may comprise a charge unit which charges for the message intermediate by the intermediate unit.

The charge unit may carry out charging when the intermediate unit transmits a message from the target member to the introduced member first time, or transmits a reply message by the introduce member to the message by the target member.

The database may store attribute information of the members, for example, information representing characteristics of the members and search options of the members. In this case, the member extracting unit may extract members whose character information matches with the search option of the target member.

The member extracting unit may extract members at predetermined timings repeatedly, for example, at every predetermined cycle or every predetermined time, or extract members in response to a request from the target member.

The member extracting unit may further comprise a member limiting unit which limits the extracted members to the predetermined numbers with using, for example, random numbers.

The member extracting unit may include a member excluding unit which excludes members who have been introduced to the target member before and/or members to whom the target member has been introduced before, from the members to be introduced to the target member.

The system may further comprising an information providing unit which provides the target member with information regarding to the introduced members.

The system may further comprise:

a web page storage unit which stores web pages each showing profile data of each member;

a message storage unit which stores messages posted to the members;

a web page providing unit which provides each member with a web page on which a list indicating extracted members to be introduced, and a message arrival indicator item representing that messages from the other members have arrived;

a web page reading unit which reads out the web page showing profile data of the introduced member from the web page storage unit in response to selecting the introduced member from the list on the web page of the target member, and provides the target member with the read-out profile web page; and a message reading unit which reads out messages posted to the target member from the message storage unit in response to selecting the message arrival indicator item, and provides the target member with the read-out messages.

Each of the web pages for showing the profile data of the members may have a request transmission item for transmitting a request for transmitting a message, and the system may further comprises a form providing unit which provides a form page for inputting and transmitting the message in response to selecting the request transmission item.

The system may further comprise:

a charge unit which carries out charging, and a message storage unit which stores the message from the member on the message storage unit with activating the charge unit.

Each of the web pages for showing the profile data of the member (for example, member A) may have a request transmission item for transmitting a request for transmitting a message to the introduced member (member B), and the system may further comprise:

a first form providing unit which provides (the member A with) a form page for inputting and transmitting a message to the introduced member (member B), in response to selecting the selective indication;

a first storage control unit which receives a message inputted through the form page from the target member (member A), and stores the received message on a first message memory (bulletin board, etc.) prepared for the destination member (member B);

a second form providing unit which provides (the member B with) a form page for inputting and transmitting a reply message to the message (given by the member A) stored in the first message memory, in response to a request given by the member (member B) who received the message; and a second storage control unit which receives (from the member B) the reply message inputted through the form page provided by the second form providing unit, and stores the received reply message on a second message memory (provided for the member A).

The system may further comprise a charge unit which carries out charging when the second storage control unit stores the reply message on the second message memory.

A system for intermediating messages according to a third aspect of the present invention comprises:

a members' information database which stores attribute information of a plurality of members;

an open information database which stores open web pages each of which includes member's open information and a request transmission item for transmitting a request for message transmission;

an electronic bulletin board storage unit which stores electronic bulletin boards of the members;

an introduction member extraction unit which extracts members (member B) to be introduced to another member (member A) based on attribute information in the members' information database;

a member's web page providing unit which transmits (to the member A) the member's web page having introduction member selector items for selecting an introduction member (member B) extracted by the introduction member extraction unit;

a message transmission unit which transmits a message input form to the target member (member A) in response to selecting the request transmission item prepared on the transmitted open information web page; and a form receiving unit which receives the form in which a message is input from the target member (member A), and posts the received message to a bulletin board of the introduction member (member B).

The member's web page providing unit may comprise, for example, a message arranging unit which arranges a message arrival indicator item (including icon, button, hypertext, etc) indicating that a bulletin board of a member to whom a web page will be provided receives a message, on the web page to be provided in a case where a new message has arrived, and the system may further comprise: a bulletin board transmission unit which transmits a bulletin board having a replay request item for requesting transmission of a reply to the message; a reply transmission unit which transmits a reply message input form to the member who selected the reply request item; and a form receiving unit which receives the form on which a reply message is input, and posts the reply message to a bulletin board of the member who transmitted the message.

The member's web page providing unit may provide a member with a member's web page (top page) on which an introduction member selector item for selecting introduction members and a message arrival indicator item for indicating a message has arrived are arranged when the member accesses the system.

The system may further comprise a charge unit which charges the target user when the target member posts a message to the bulletin board of the introduction member, or when the target member receives a reply message from the introduction member through the bulletin board of the target member.

A computer readable recording medium according to a fourth aspect of the present invention stores a program to be executed by a computer or computers to make the computer or computers have functions of:

an introduction member extraction unit which extracts members to be introduced to another member based on attribute information stored in a database storing attribute information of a plurality of members;

an extracted member introducing unit which introduces a target member who searches other members of the introduction members extracted by the introduction member extraction unit; and an intermediate unit which intermediates message exchanges between the target member and the introduced members.

BRIEF DESCRIPTION OF THE DRAWINGS

These objects and other objects and advantages of the present invention will become more apparent upon reading of the following detailed description and the accompanying drawings in which:

FIG. 5 is a diagram showing the data structure in an open profile database shown in FIG. 4;

FIG. 6A is a diagram showing the data structure in a personal information data base shown in FIG. 4;

FIG. 6B is a diagram showing the data structure in a detailed personal profile database shown in FIG. 4;

FIG. 6C is a diagram showing the data structure in a personal top page database shown in FIG. 4;

FIG. 7 is a diagram showing the data structure in a personal BBS database shown in FIG. 4;

FIG. 8 is a diagram showing the data structure in a charge information database shown in FIG. 4;

FIG. 10 is a diagram exemplifying a top page which introduces a member;

FIG. 11 is a diagram exemplifying a profile presentation page;

FIG. 12 is a diagram exemplifying an interface screen for inputting a message;

FIG. 13 is a diagram exemplifying a dialog box asking a user about agreement upon payment;

FIG. 14 is a diagram exemplifying a top page for introducing a member;

FIG. 15 is a diagram exemplifying a personal BBS for a member;

FIG. 16 is a diagram exemplifying a profile presentation page;

FIG. 17 is a diagram exemplifying an interface screen for inputting a message;

DETAILED DESCRIPTION OF THE PREFERRED EMBODIMENT

An embodiment of the present invention will now be described with reference to the accompanying drawings.

An outline of a service or a business model provided through this embodiment will now be described first.

MEMBER REGISTRATION

Figure 1:
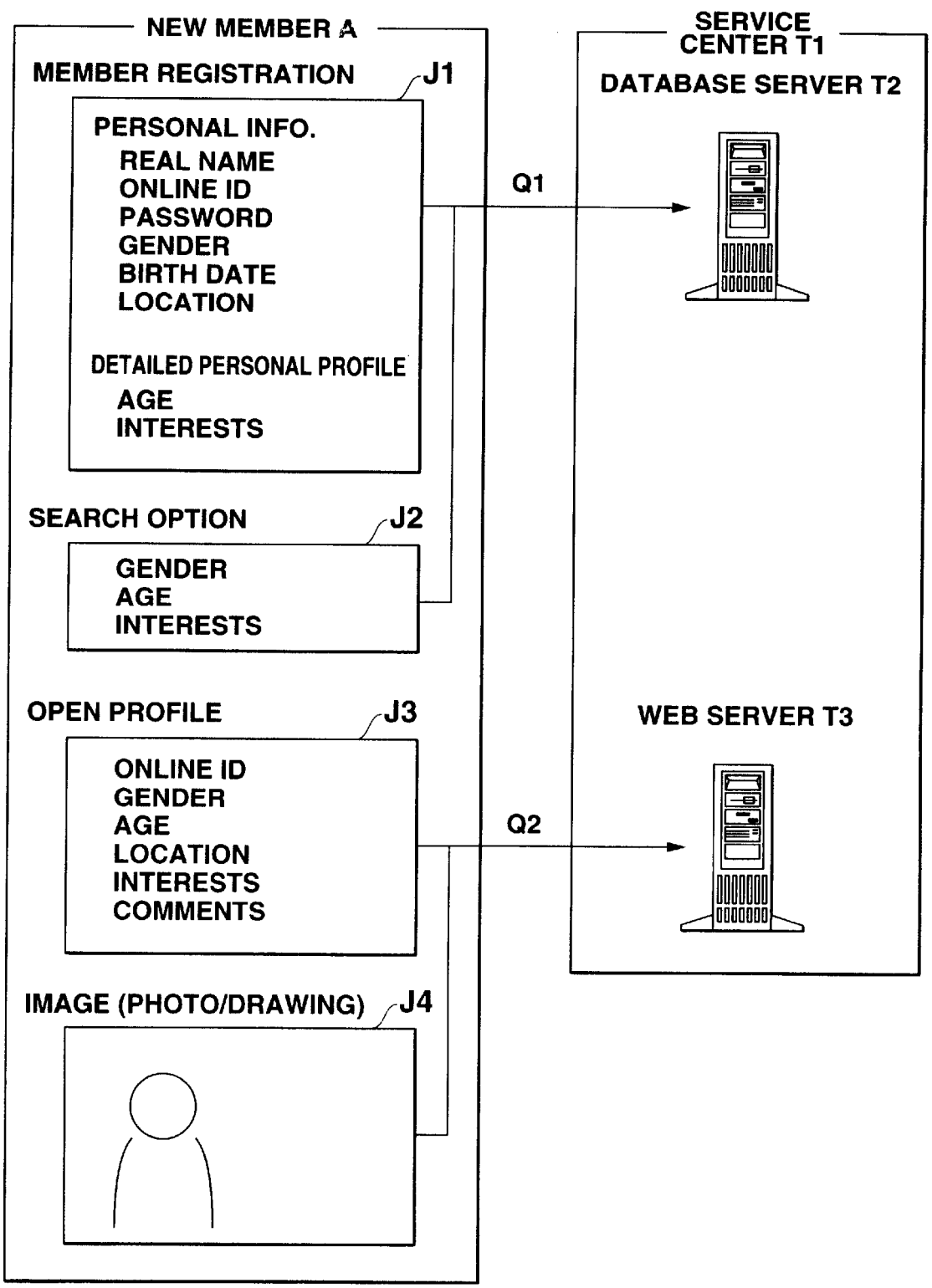
FIG. 1 is a diagram for explaining member registration process in an information intermediate system according to an embodiment of the present invention.

As shown in FIG. 1, a user registers his/her personal information (name, password, profile information, etc.) J1 and search option (gender, age, interest, etc.) J2 on a database server T2 installed in a service center T1 (Q1). The user also registers his/her open profile information (online ID, gender, age, location, interest, comments) J3 and the user's image data (picture or drawing) 34 on a web server T3 (Q2). The web server T3 prepares web pages including the registered open profile information and the user's images, and opens the web pages on the internet.

MEMBER INTRODUCTION

Figure 2:
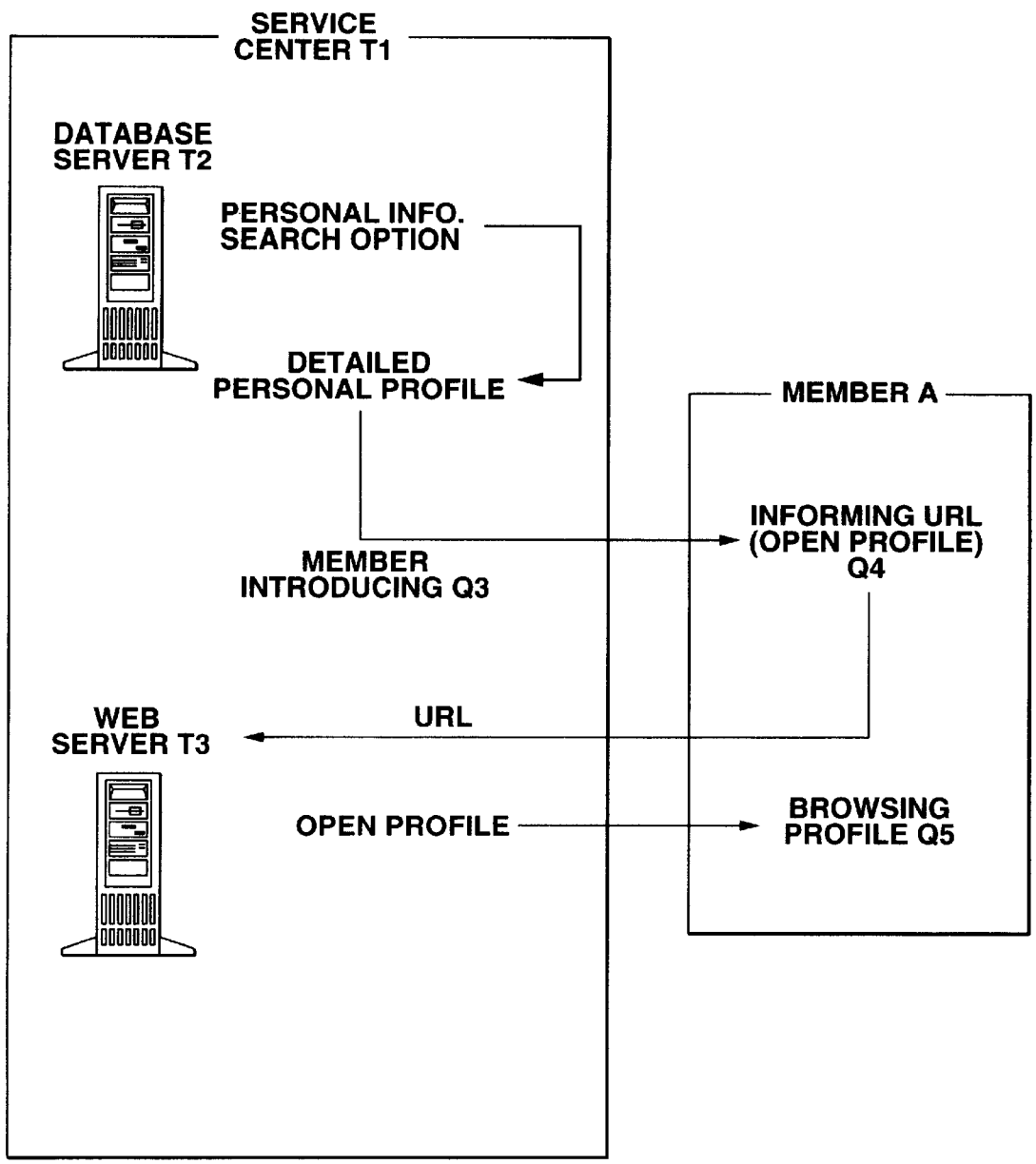
FIG. 2 is a diagram for explaining member presentation process in the information intermediate system according to the embodiment of the present invention.

The database server T2 constantly extracts members who match with the search options as shown in FIG. 2 (Q3). The database server T2 informs a request sender (hereinafter, referred to as member A) of URL indicating the web pages including open profile information of an extracted member (hereinafter, referred to as member B) (Q4).

The member A refers to the profile of the member B who has been introduced to the member A (Q5).

POSTING A MESSAGE TO PERSONAL BBS

Figure 3:
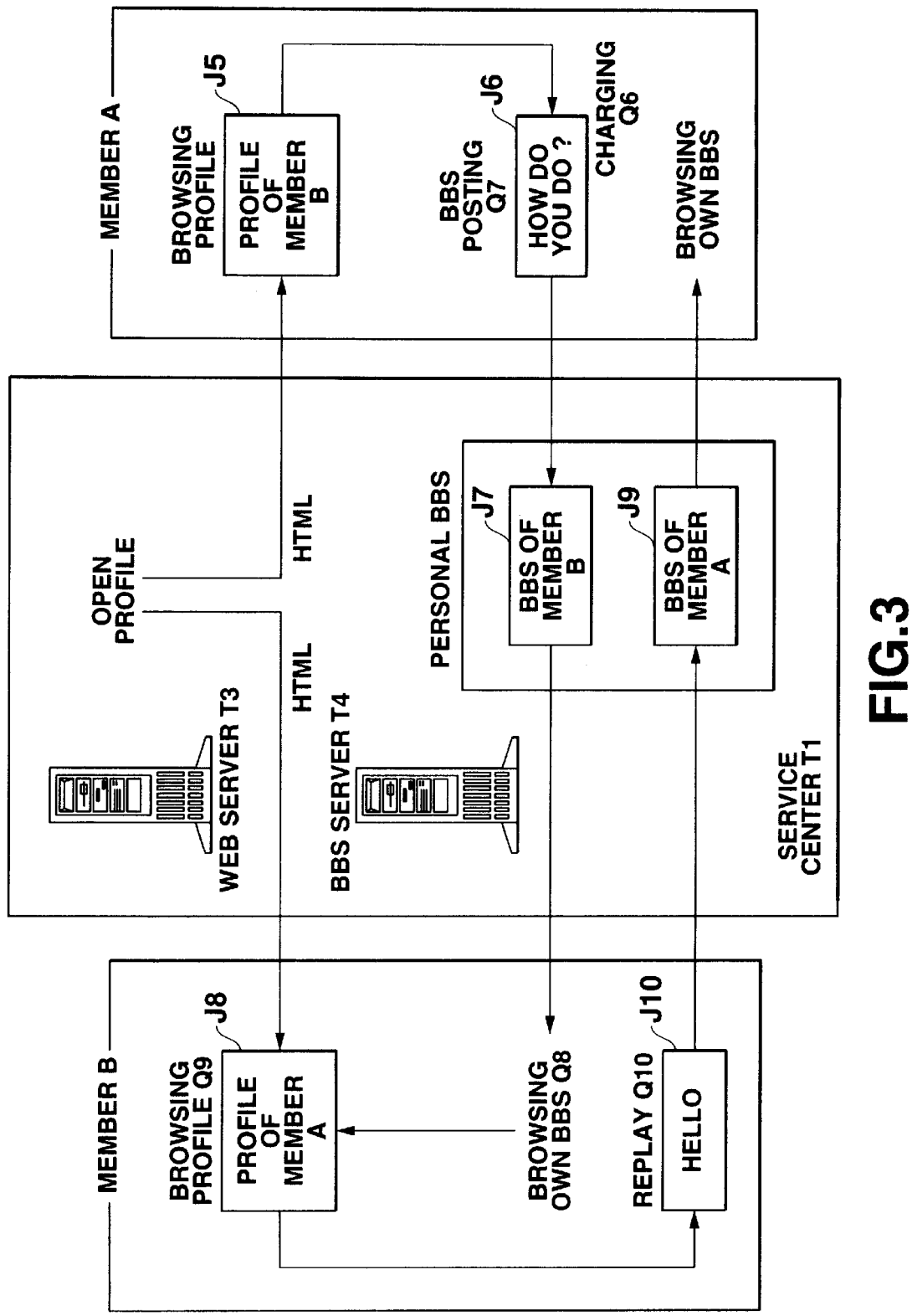
FIG. 3 is a diagram for explaining process for exchanging messages between a searcher and a matched member in the information intermediating system according to the embodiment of the present invention.

The member A refers to an open profile page J5 of the member B as shown in FIG. 3. If the member A wants to exchange messages with the member B, the member A requests a BBS server T4 to allow the member A to post a message to the BBS of the member B. If it is the first positing to the member B from the member A, the BBS server T4 charges the member A (Q6), and allows the member A to post a message J6 to a personal BBS J7 of the member B (Q7).

REFERRING TO RESPONSE

The member B reads a message J6 posted to the personal BBS J7 by the member A (Q8), while referring to an open profile page J8 of the member A (Q9).

POSITING A REPLY TO BBS

After referring to the message J6 and the open profile page J8 of the member A, the member B posts a message J10 to a BBS positing page J9 of the member A (the BBS server T4 does not charge the member B for this positing) (Q10).

If they get along with, they continue to exchange messages. The BBS server T4 does not charges the members A and B for exchanging those messages.

Accordingly, this network system intermediates between the members for introducing the members, and allows them to exchange messages without charges except the first contact with posting a message to the BBS.

Figure 4:
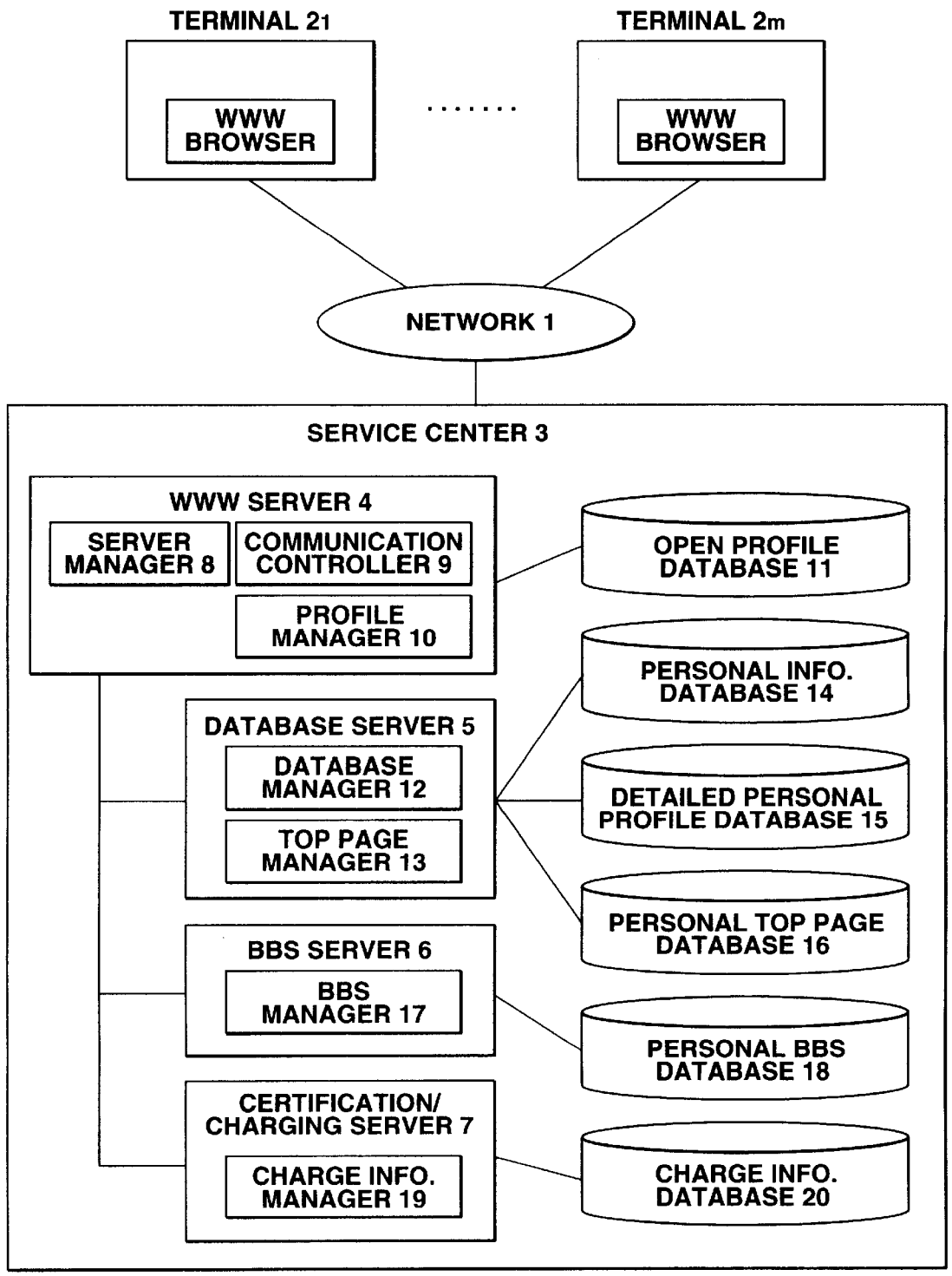
FIG. 4 is a diagram showing the structure of the information intermediate system according to the embodiment of the present invention.

The structure of a system for information exchanging service for realizing the above described service for searching folks will now be described with reference to FIG. 4.

The system according to this embodiment comprises a plurality of member's terminals $2_1$ to $2_m$ (m is an arbitrary natural number), and an information intermediate service center 3 (hereinafter, referred to as service center 3) which are connected to a network 1.

Each of the member's terminals $2_1$ to $2_m$ has web browsing function by which the terminal refers desired web pages indicated by designated URL (Uniform Resource Locator). For example, the user's terminal 2x (x is an arbitrary number from 1 to m) is connectable to top pages assigned to any members or a personal BBS.

More precisely, each of the member's terminals $2_1$ to $2_m$ has a WWW browser for browsing HTML (Hyper Text Markup Language) files. The WWW browser allows a member to input desired URL, and displays the web pages indicated by the input URL after connecting to a web site of the designated web pages.

The service center 3 comprises a WWW server 4, a database server 5, a BBS server 6, and a certification/charging server 7.

The WWW server 4 comprises a server manager 8, a communication controller 9, and a profile manager 10, and transmits HTML documents to the WWW browsers. The WWW server 4 is connected to an open profile database 11. The server manager 8 manages operations of servers in the service center 3. The communication controller 9 controls communication between the service center 3 and any of the member's terminals $2_1$ to $2_m$. The profile manager 10 manages the open profile database 11 and prepares web pages including open profile information of the members to be presented.

The database server 5 comprises a database manager 12 and a top page manager 13, while being connected to a personal information database 14, a detailed personal profile information 15, and a personal top page database 16. The database manager 12 manages the personal information database 14, the detailed personal profile database 15, and the personal top page database 16. The top page manager 13 prepares top pages for the members based on information stored in the personal top page database 16, and presents the prepared pages.

The BBS server 6 comprises a BBS manager 17, while being connected to a personal BBS database 18. The BBS manager 17 manages the personal BBS database 18, and prepares personal bulletin boards for the members to be presented.

The certification/charging server 7 comprises a charge information manager 19, while being connected to a charge information database 20. The charge information manager 19 updates charge information in the charge information database 20 and manages it.

The databases shown in FIG. 4 will now be described with reference to FIGS. 5 to 8.

The open profile database 11 stores personal information of the members who have been registered at the information exchanging service. As shown in FIG. 5, the database 11 has fields of member account, online ID, gender, age, location, interest, comments, URL of personal BBS, images, etc. associated with the members respectively. The member account is represented by unique data assigned to each member by the WWW server 4. The URL of personal BBS indicates a personal BBS page assigned to the members respectively. The images include a picture or a drawing representing the member itself.

The personal information database 14 stores personal information regarding to the members registered at the information exchanging service. As shown in FIG. 6A, the database 14 has fields of member account, name, online ID, password, gender, birth date, location, search option, etc. associated with the members respectively. The password is determined by a member which is necessary for certifying the member.

The detailed personal profile database 15 stores personal information regarding to the members registered at the information exchanging service. As shown in FIG. 6B, the database 15 has fields of member account, online ID, gender, age, interest, URL for open profile, member account of introduced members, etc. associated with the members respectively. The URL for open profile which indicates profile pages assigned to the members respectively.

The personal top page database 16 stores information linked to the top pages. As shown in FIG. 6C, the database 16 has fields of member account, introduced members' accounts, online ID of the introduced members, URL for personal profile of the introduced members, BBS positing flag, etc. associated with the members respectively.

The BBS posting flag indicates whether any messages are posted to the BBS. The flag is set to 1 when the BBS has posted messages, while is reset to 0 when no message is posted. The set flag is reset when the owner member of the BBS accesses the BBS.

The personal BBS database 18 stores information posted to the personal BBS. As shown in FIG. 7, the database 18 has fields of member account, online ID, password, message, etc. associated with the members respectively. The message segment may hold 50 messages at maximum with the FIFO (first-in, first-out) structure.

The charge information database 20 stores charge information. As shown in FIG. 8, the database 20 has fields of member account, charge counter, charged members' accounts, etc. associated with the members respectively. The charge counter is counted up (updated) when a member posts a message to a personal BBS of an introduced member first time. Member account of members who own BBS to which the user posted messages are registered at the charged members' account field.

An outline of process executed in the system for information exchanging service according to this embodiment will now be described with reference to FIG. 9. Similar to the situation of the model which was explained with reference to FIGS. 1 to 3, the following description explains situation where a user A (member A: Taro) registers with the information exchanging service, and a member B (Hanako) who has been already registered will be introduced to the member A.

STEP S1: MEMBER REGISTRATION

The user A accesses an information exchanging service center (hereinafter, referred to as service center) 3 to sign up (S1001). After the sign up, personal information, profile information, search option, etc. of the user A are registered at the service center 3.

STEP S2: INTRODUCTION EXTRACTION

The service center 3 searches the database server 5 for several members who are suitable for the search option given by the user A, and extracts the member B as an introduction.

STEP S3: INTRODUCING EXTRACTED MEMBER

The member A requests the service center 3 to send a top page prepared by the service center 3 for the member A to the member A. In response to the request given by the member A, the service center 3 transmits the top page for the member A as shown in FIG. 10 (step S3002). The top page indicates online ID of the member B (=Hanako) who has been introduced to the member A. The indicated online ID is hyper-linked to a web page including open profile of the member B. The top page also indicates that a message has been posted to the personal BBS of the member A as described later.

A request for referring the profile of the member B is sent to the service center 3 by clicking the online ID of the introduction (step S3003). In response to the request given by the member A, the service center 3 transmits the linked open profile page of the member B as shown in FIG. 11 to the member A (step S3004).

STEP S4: BBS POSTING

As shown in FIG. 11, the open profile page has a hypertext indication being linked to a form page for inputting a message to be posted to the BBS of the member B. If the member A wants to post a message to the BBS of the member B, the member A requests the service center 3 to send the form page by clicking the hypertext (step S4001).

In response to the request, the service center 3 transmits the linked page including the form page for inputting a message to be posted to the BBS of the member B as shown in FIG. 12 (step S4002). The member A fills in a message field on the received form page and clicks hypertext indicating "POST". In response to the clicking, a request for posting is transmitted to the service center 3 (step S4003).

The service center 3 receives the request. If it is the first posting by the member A to the member B, the service center sends a dialog box which warns the member A that he/she will be charged if the message is posted, as shown in FIG. 13 (step S4004).

The member A replies to the dialog box which warns against charging (step S4005). If charging is unacceptable, the member A clicks hypertext indicating "NO". In this case, the message input in the message field on the form page is not posted to the personal BBS of the member B. On the contrary, if the member A clicks another hypertext indicating "YES", the input message is posted to the personal BBS of the member B. The following explanation describes a case after the member A clicks the hypertext indicating "YES".

A case where the member B replies to the message posted by the member A will now be described.

STEP S5: REPLY PREPARATION

The member B requests the service center 3 to send the top page prepared for the member B (step S5001). In response to the request, the service center 3 transmits the top page of the member B as shown in FIG. 14 (step S5002). The configuration of the top page shown is FIG. 14 is basically the same as that of the top page shown in FIG. 10, however, it includes an indication that message(s) is posted to the BBS in addition to online ID (Jiro, Seiko) of introductions extracted by the service center 3, as shown in FIG. 14.

The member B requests the service center 3 to send the BBS of the member B (step S5003) to read the message posted by the member A (Taro) as shown in FIG. 15 (step S5004). If the member B wants to see profile of the member A, the member B requests the service center 3 to send the profile of the member A by clicking online ID of the member A indicated on the BBS page (step S5005). In response to the request, the service center 3 transmits the open profile page of the member A as shown in FIG. 16 (step S5006). The configuration of the open profile page shown in FIG. 16 is basically the same as that of the open profile page of the member B shown in FIG. 11, however, it is specialized in showing information regarding to the member A.

STEP S6: POSTING A MESSAGE TO BBS

As shown in FIG. 16, the open profile page has a hypertext indication being linked to a page including a form page for inputting a message to be posted to the personal BBS of the member A. If the member B wants to post a message to the BBS of the member A, the member B requests the service center 3 to send the form page for posting a message (step S6001).

In response to the request, the service center 3 transmits the form page for inputting a message to be posted to the BBS of the member A as shown in FIG. 17 (step S6002). The configuration of the form page shown in FIG. 17 is basically the same as that of the form page for inputting a message to be posted to the BBS of the member B shown in FIG. 12.

The member B fills in a message field on the form page sent by the service center 3, and requests the service center 3 to post the input message to the BBS of the member A (step S6003). Thus, the message by the member B is posted to the BBS of the member A. The service center 3 does not charge the member B for the positing.

STEP S7: REFERRING TO THE REPLY

Figure 31:
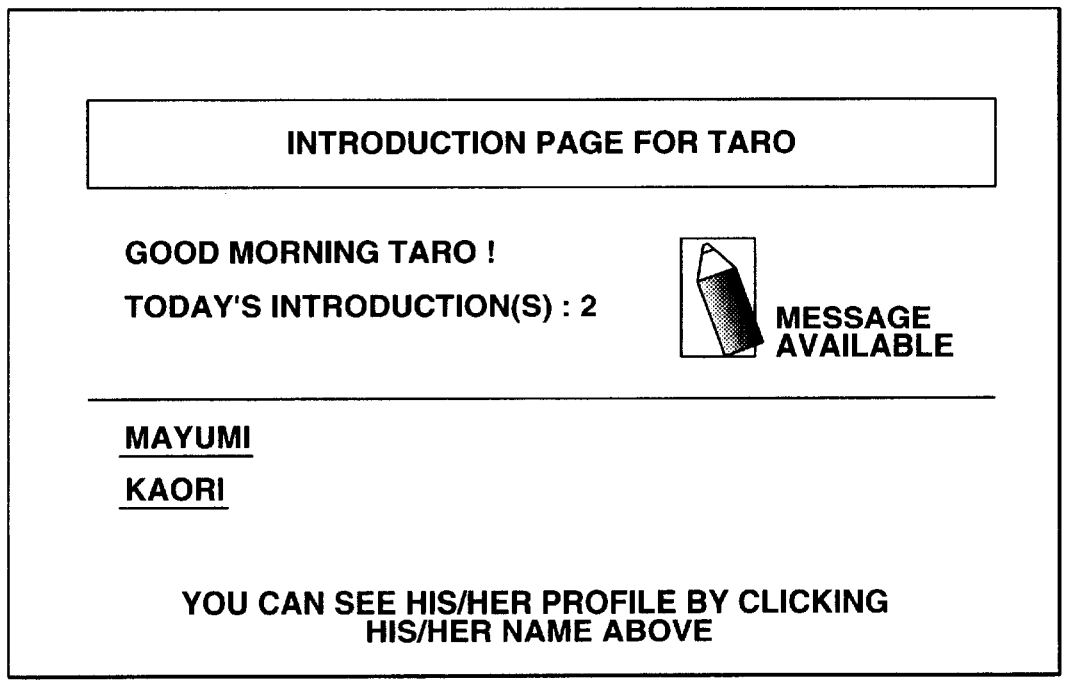
FIG. 31 is a diagram exemplifying a top page.

If the member A wants to see the reply by the member B, the member A requests the service center 3 to transmit the top page prepared for the member A (step S7001). In response to the request, the service center 3 transmits the top page of the member A as shown in FIG. 31 (step S7002). The configuration of the top page is basically the same as that of the top page shown in FIG. 10, however, it includes an indication that a message(s) has been posted to the BBS of the member A, in addition to online ID of new introductions.

Figure 18:
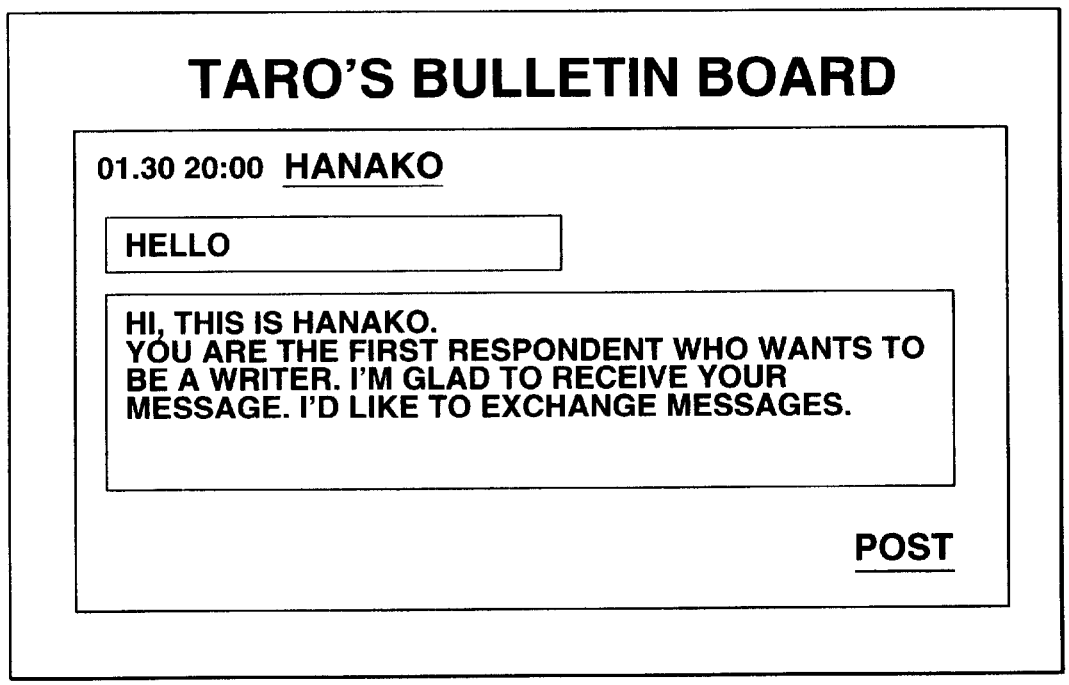
FIG. 18 is a diagram exemplifying a personal BBS of a member.

The member A requests the service center 3 to send the personal BBS page of the member A (step S7003). In response to the request, the service center 3 transmits the BBS page as shown in FIG. 18 (step S7004). Thus, the member A can read the reply posted by the member B to the BBS of the member A. The configuration of the BBS page shown in FIG. 18 is basically the same as that of the BBS page of the member B shown in FIG. 15.

STEP S8: POSTING A MESSAGE TO THE BBS

As shown in FIG. 18, the BBS page of the member A has a hypertext indication "REPLY"0 being linked to the form page for inputting a reply message to be posted to the BBS of the member B. If the member A wants to post a reply message to the BBS of the member B, the member A requests the service center 3 to send the form page by clicking the hypertext (step S8001). In response to the request, the service center 3 transmits the form page for inputting a message to be posted to the BBS of the member B as shown in FIG. 12 (step S8002).

The member A fills in a message field on the received form page, and requests the service center 3 to post the input message to the BBS of the member B (step S8003). Thus, the input message is posted to the BBS of the member B. The service center 3 does not charge the member A for the posting.

For exchanging more messages between the members A and B, they repeatedly executes the above steps S5 to S8.

The process executed in the system for the information exchanging service shown in FIG. 9 will now be described in detail with reference to the accompanying drawings.

Figure 19:
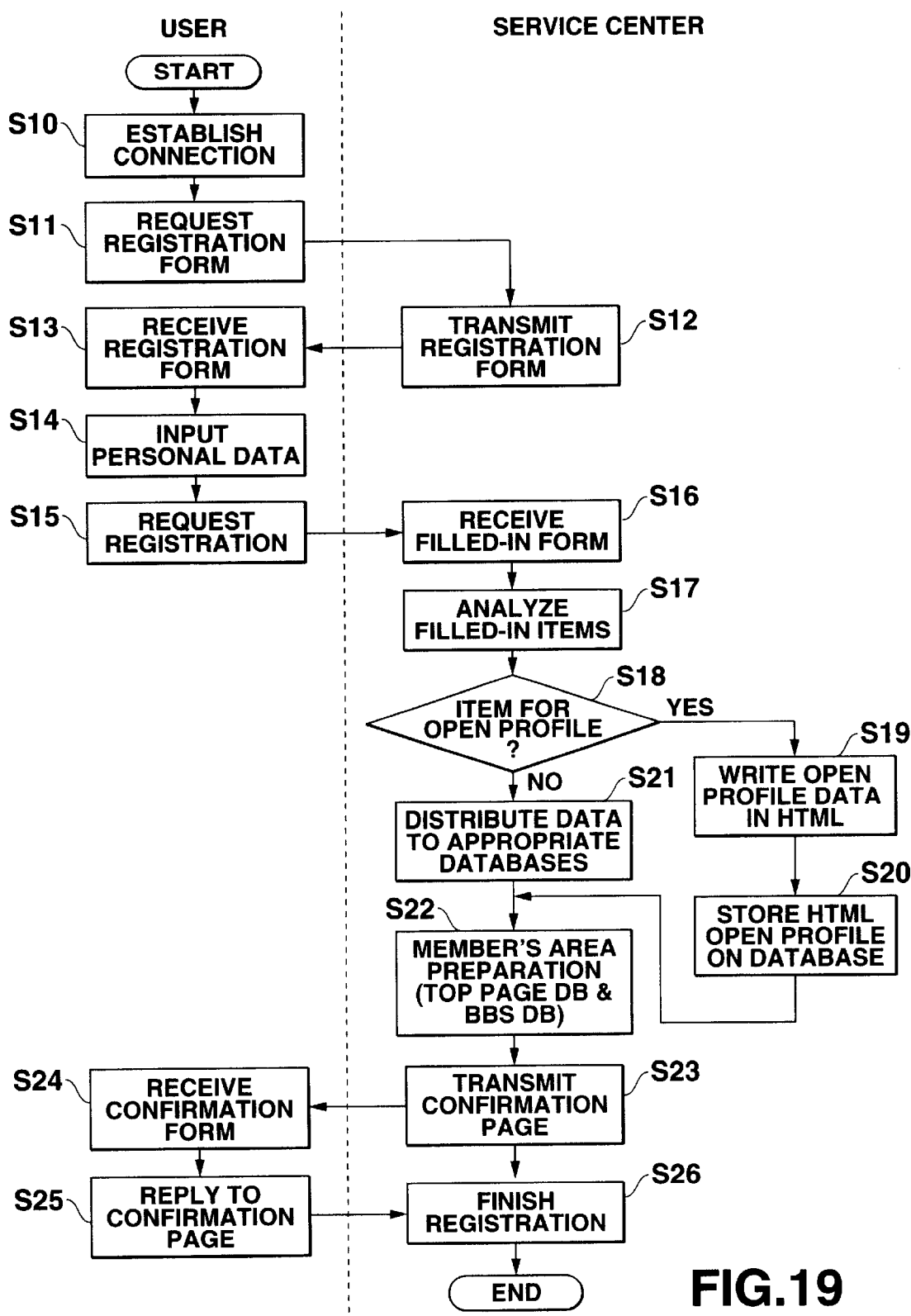
FIG. 19 is a flowchart for explaining a member registration process shown in FIG. 9.

The member registration process executed at step S1 in FIG. 9 will now be described with reference to FIG. 19.

The user A operates his/her terminal 2x (x is an arbitrary number from 1 to m) to execute the WWW browser, and assesses the web page (top page) of the service center 3 (step S10). The user A requests the service center 3 to send a sign up form prepared for new member registration (step S11).

In response to the request, the service center 3 transmits the sign up form to the member's terminal 2x (step S12).

Figure 20:
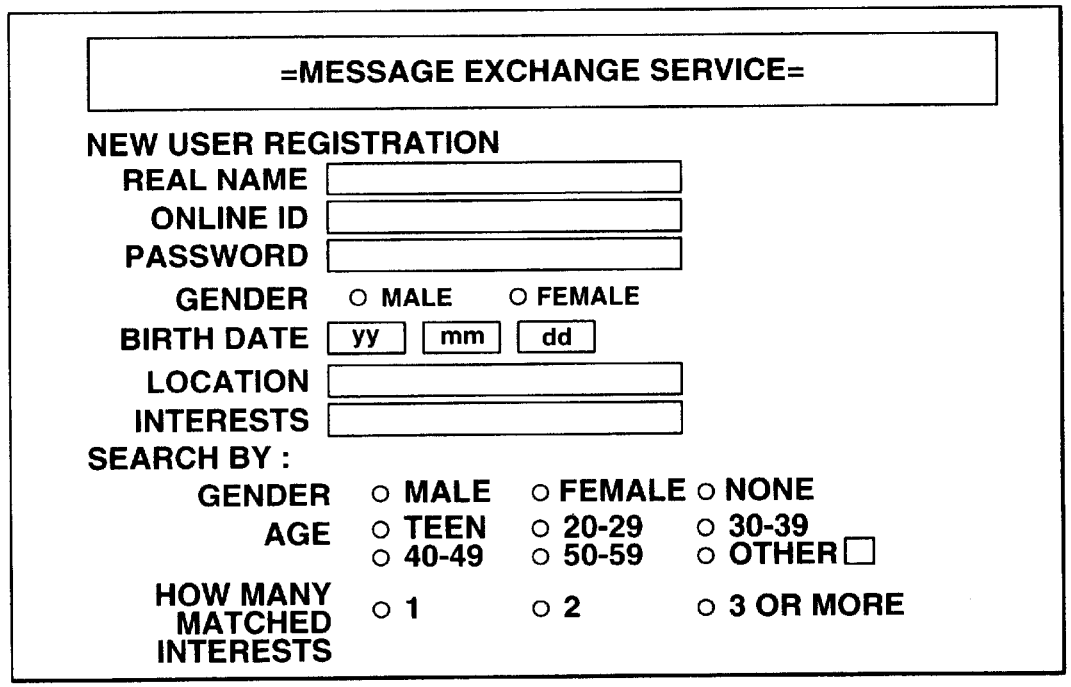
FIG. 20 is a diagram exemplifying a registration form.

The member's terminal 2x of the user A receives the sign up form from the service center 3 and displays it (step S13). For example, a sign up page shown in FIG. 20 is displayed on the member's terminal 2x. The user A fills in input fields on the sign up form to input personal information (online ID, gender, birth date, location), profile information (interests, comments), and search option (gender, age, number of matched interests). The user A may input information representing that which items in the input personal data are allowed to be opened to public, as needed (step S14). After necessary fields are filled in, the user A transmits the data to request the service center 3 to accept the registration (step S15).

The service center 3 receives the filled-in sign up page from the user A (step S16). The service center 3 prepares member account and password for the user A, while checking the received data item by item (step S17). Then, the service center 3 generates data for the open profile database (however, an item for URL of the personal BBS is blank) as shown in FIG. 5, data for the personal information database shown in FIG. 6A, and data for the detailed personal profile database (however, an item for URL of the personal profile page is blank). The generated data sets are classified into data sets for the open profile database and data sets for the others (step S18).

The data sets for the open profile database are converted into HTML files (step S19), and the HTML files are transferred to the open profile database 11 for storing them on there as shown in FIG. 5 (step S20).

The data sets not for the open profile database, that is, for the personal information database 14 and the detailed personal profile database 15 are directly transferred to those databases for storing them on appropriate databases as shown in FIGS. 6A and 6B (step S21). More precisely, member account, personal data (name, password, gender, birth date, and location), and search option (gender, age, and number of matched interests) are associated with each other, and are stored on the personal information database 14 as shown in FIG. 6A, while member account, online ID, gender, age, interests, and URL for open profile page stored at step S20 are associated with each other, and are stored on the detailed personal profile database 15 as shown in FIG. 6B (however, an item for member accounts of introduced members is blank).

The service center 3 prepares areas for the user A in the personal top page database 16 and the personal BBS database 18 (step S22). The service center 3 stores URL which indicates the area for the user A in the personal BBS database 18 on the open profile database 11.

Figure 21:
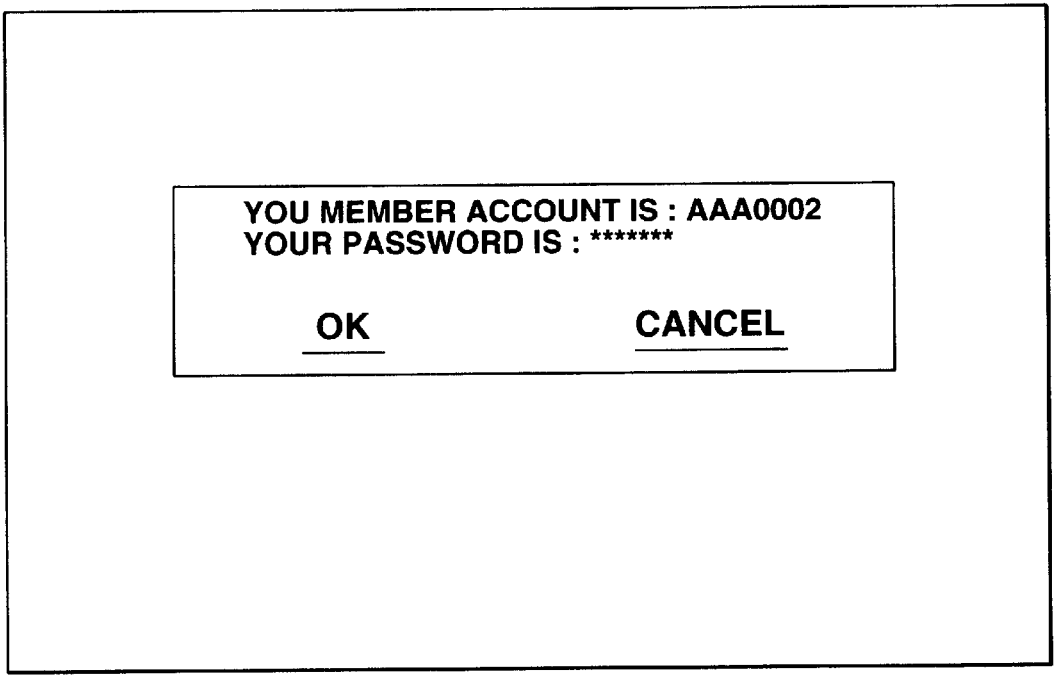
FIG. 21 is a diagram exemplifying a dialog box for confirming registration.

The service center 3 transmits a registration confirming page to the user A (step S23). The registration confirming page indicates member account and password prepared for the user A as shown in FIG. 21. The service center 3 also generates a piece of text string information for identifying the user (Cookie file), and sends it to the WWW browser together with the registration confirming page.

The member's terminal 2x operated by the user A receives the registration confirming page from the service center 3, and displays it (step S24). The user A takes notes of the member account and the password on the registration confirming page. The WWW browser stores the text string information (Cookie file) which arrived with the registration confirming page.

The user A clicks a hypertext indication "OK" on the registration confirming page shown in FIG. 21 to inform the service center 3 that the user A confirms the member account and the password (step S25).

The service center 3 receives the information, and completes the registration process (step S26). Thus, the user A is registered at the service center 3 as a new member of the message exchanging service.

Figure 22:
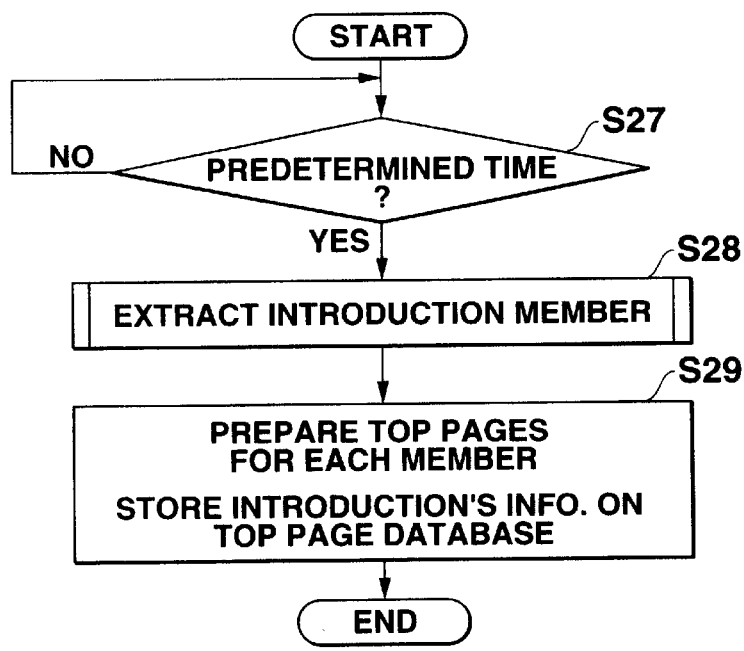
FIG. 22 is a flowchart for explaining a process shown in FIG. 9 for extracting matched members.

An outline of the introduction extracting process at step S2 in FIG. 9 will now be described with reference to FIG. 22.

The service center 3 determines whether it is appropriate timing for extracting appropriate introductions, in order to provides the appropriate introductions to the members (step S27).

When the predetermined timing for extracting introductions arrives, the service center 3 extracts appropriate introductions member by member (step S28), and generates top page information for each member as shown in FIG. 6C. Information representing the extracted introduction(s) is registered at the personal to page database 16 member by member (step S29).

Figure 23:
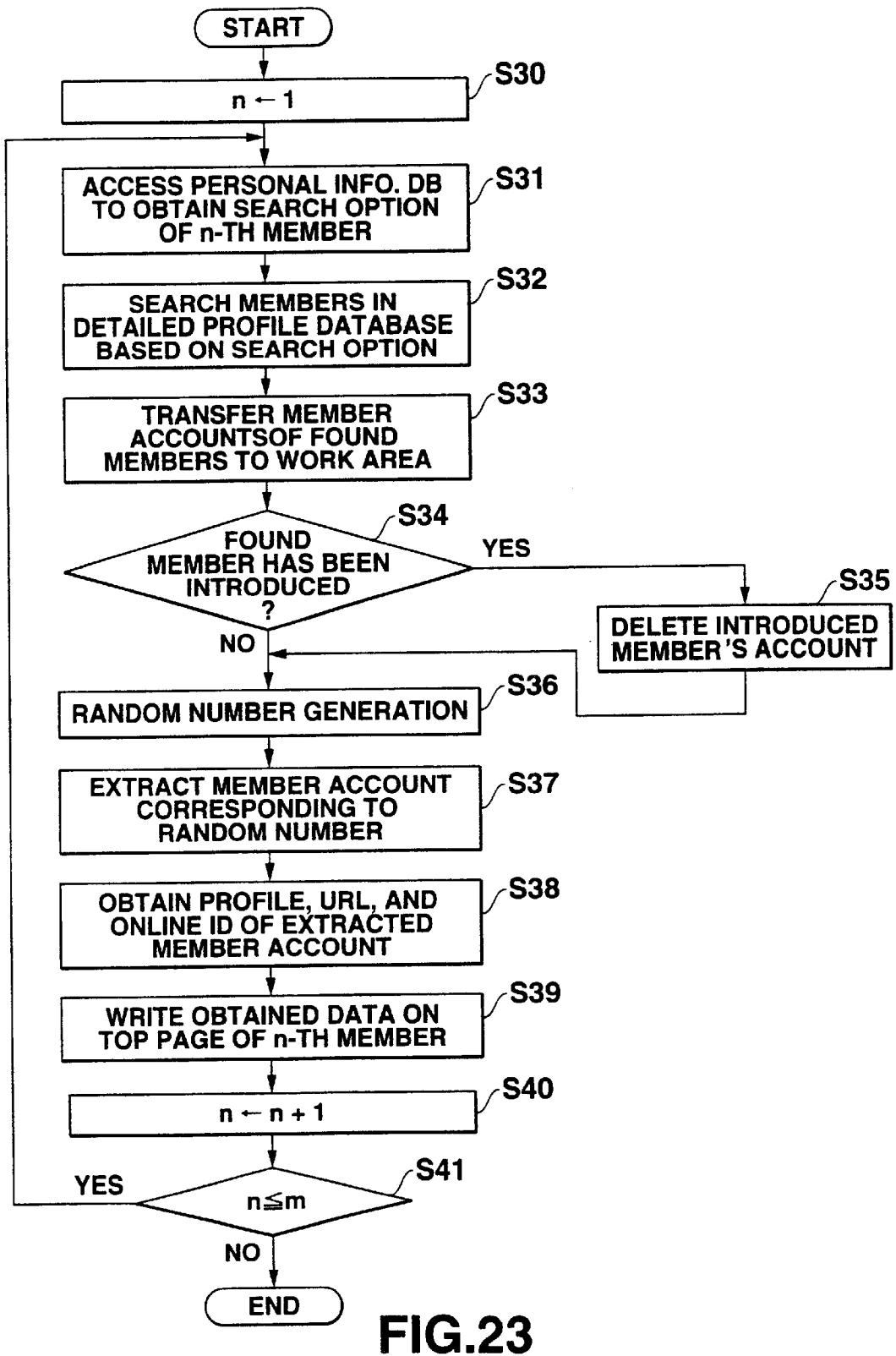
FIG. 23 is a flowchart for explaining the matched member extracting process in detail.

The process for extracting introductions at step S28 in FIG. 22 will now be described in detail with reference to FIG. 23.

The service center 3 sets "1" to a pointer n (step S30), and obtains search option of n-th member from the personal information database 14 (step S31). The database server searches the detailed personal profile database 15 in accordance with the obtained search option (step S32). That is, the database server 5 compares the search option with the information of the n-th member registered at the detailed personal profile database 15. Thus, the database server 5 sequentially obtains member accounts of members whose profiles match with the search option, and stores the obtained member accounts on a work area (step S33).

Then, the database server 5 refers to the item of "introduced member accounts" in the detailed personal profile database 15 in order to determined whether the members represented by the obtained member accounts have been already introduced to the n-th member (step S34), and deletes the introduced member accounts (step S35). If newly extracted member accounts remain after the deletion, the database server 5 generates a random numbers, and extracts one or two member account(s) corresponding to the random numbers from the remaining (step S37).

Then, the database server 5 obtains URL indicating an open profile page of the member represented by the extracted member account and his/her online ID from the detailed personal profile database 15 (step S38), and registers thus obtained information at a field for information linked to introduced members prepared for the n-th member in the personal top page database 16 (step S39).

Then, the pointer n is counted up by 1 (step S40). And, it is determined whether thus updated pointer is equal to or smaller than the number of the members m (step S41). If n is equal to or smaller than m, the flow returns to step S31. If n is larger than m, the process for extracting introductions is terminated.

Thus, appropriate introductions for the first to m-th members are extracted at the predetermined timings.

An outline of the process for introducing extracted member at step S3 in FIG. 9 will now be described with reference to FIG. 24 will now be described.

The member A (user A) executes the WWW browser in his/her terminal 2x to access the member's page provided by the service center 3 (step S42). The service center 3 identifies the member A based on Cookie data sent by the WWW browser.

The service center 3 extracts top page information for the member A from the personal top page database 16, and prepares a top page as shown in FIG. 10 based on the extracted top page information (step S43). The service center 3 transmits thus prepared top page to the member's terminal 2x (step S44).

The member's terminal 2x receives the top page (step S45), and displays it (step S46). The user A refers to the top page whether it indicates someone's online ID as an introduction (step S47). If no introduction is displayed, the user A, for example, processes other arbitrary task. In a case where the introduction(s) is displayed on the top page, the member A clicks the desired online ID (in this case, online ID representing member B) to request the service center 3 to send his/her profile (step S48).

In response to the request (step S49), the WWW server 4 searches the open profile database 11 for open profile information of the member B, and transmits the found data to the member A (step S50). Simultaneously, the database server 5 registers the member account of the member B at the introduced member field of the detailed personal profile data for the member A in the detailed personal profile database 15 as shown in FIG. 6B.

Figure 25:
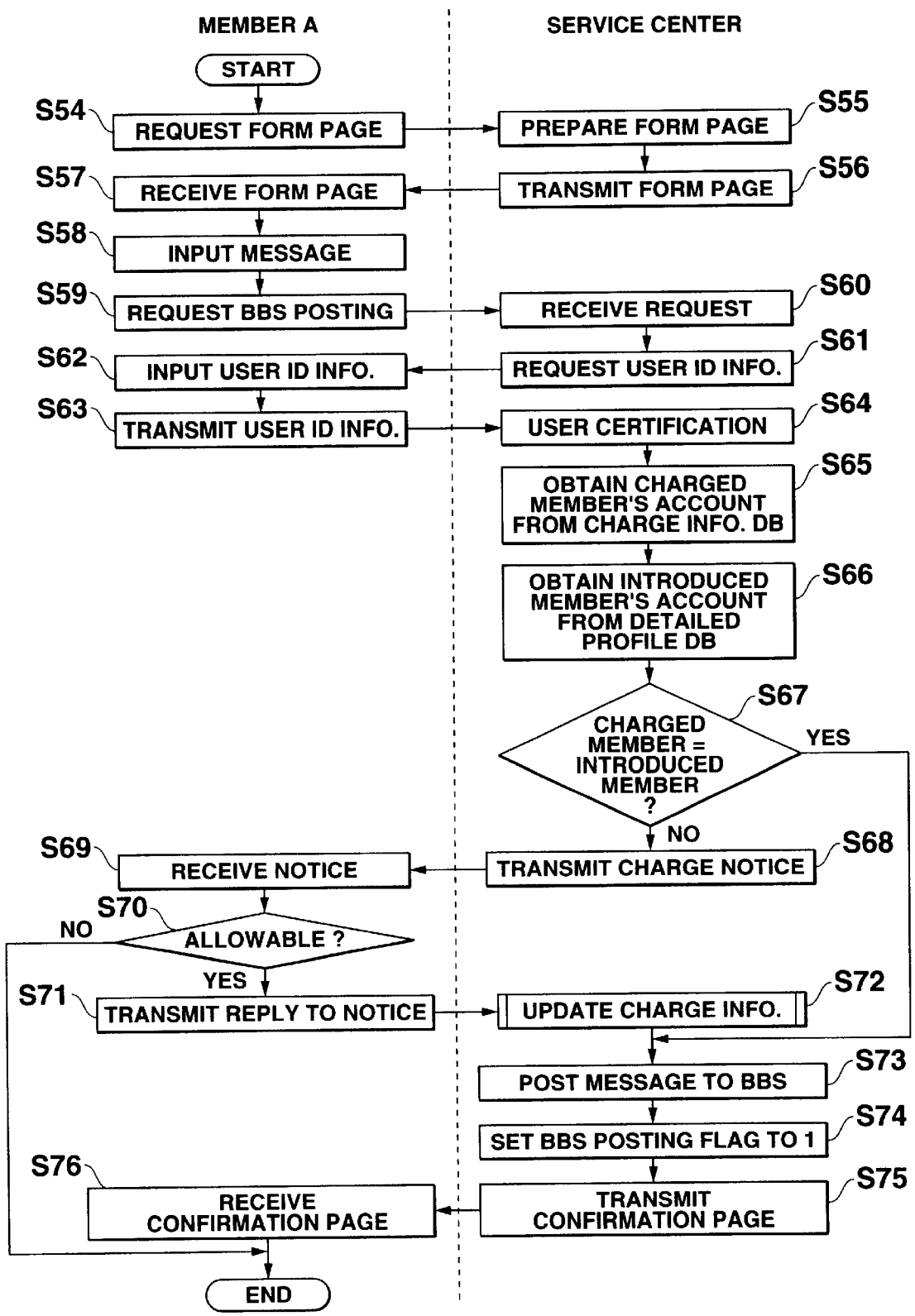
FIG. 25 is a flowchart for explaining a process shown in FIG. 9 for positing a personal BBS.

The member's terminal 2x of the member A receives the open profile information of the member B, and displays the profile page of the member B as shown in FIG. 1 (step S51). The member A determines whether he/she will post a message to the personal BBS of the member B (step S52). If his/her decision is posting a message, he/she clicks a hypertext indication "POST", and the flow goes to the later described posting process (FIG. 25). If the member A does not want to post a message, he/she requests the service center 3 to send the top page for the member A (step S53), and the flow returns to step S46.

Figure 9:
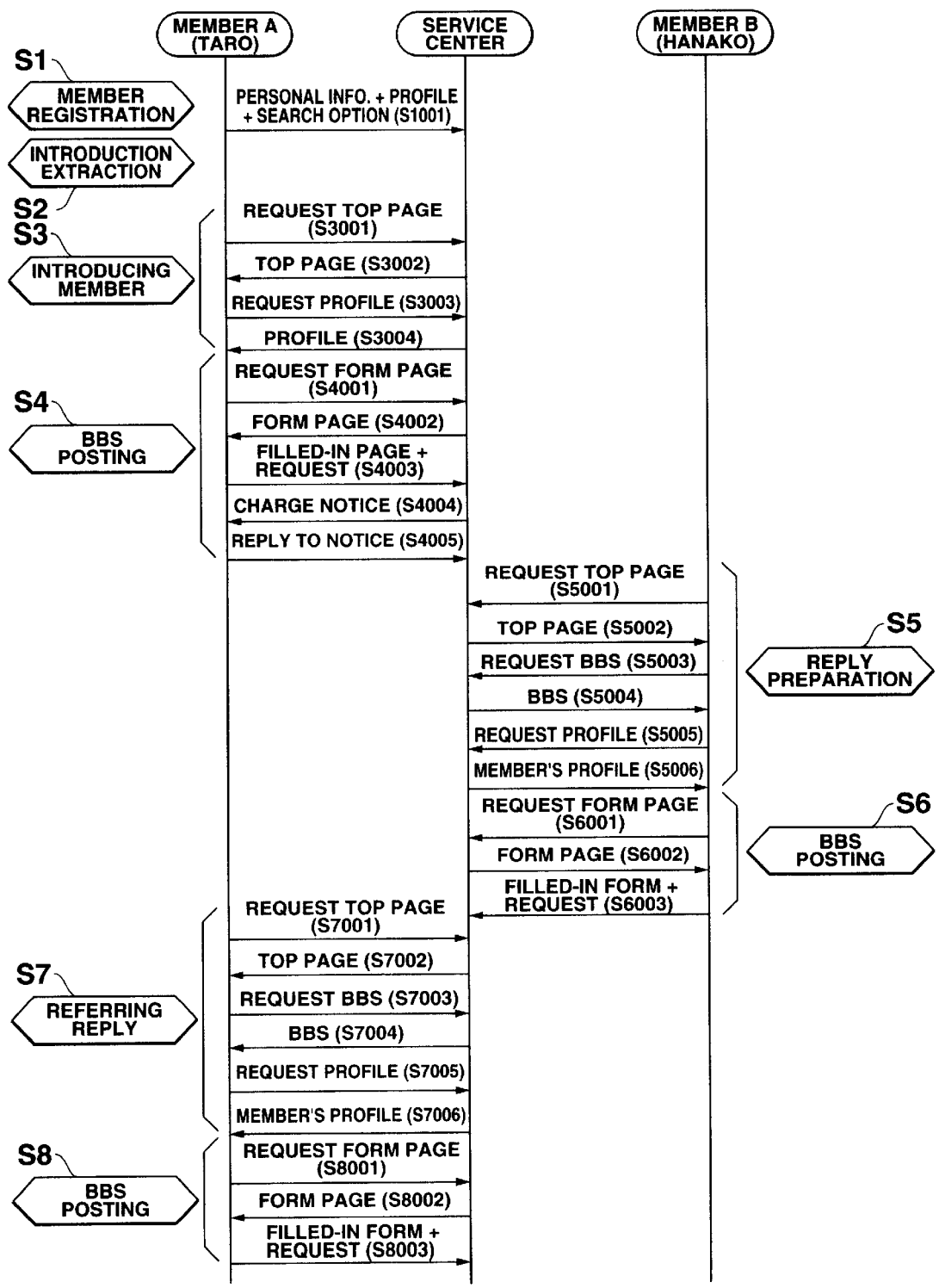
FIG. 9 is a diagram for explaining all tasks dealt in the information intermediate system shown in FIG. 4.

Thus, the process for introducing extracted member at step S3 in FIG. 9 is completed.

An outline of the process for posting a message to the BBS at step S4 in FIG. 9 will now be described with reference to FIG. 25.

Figure 24:
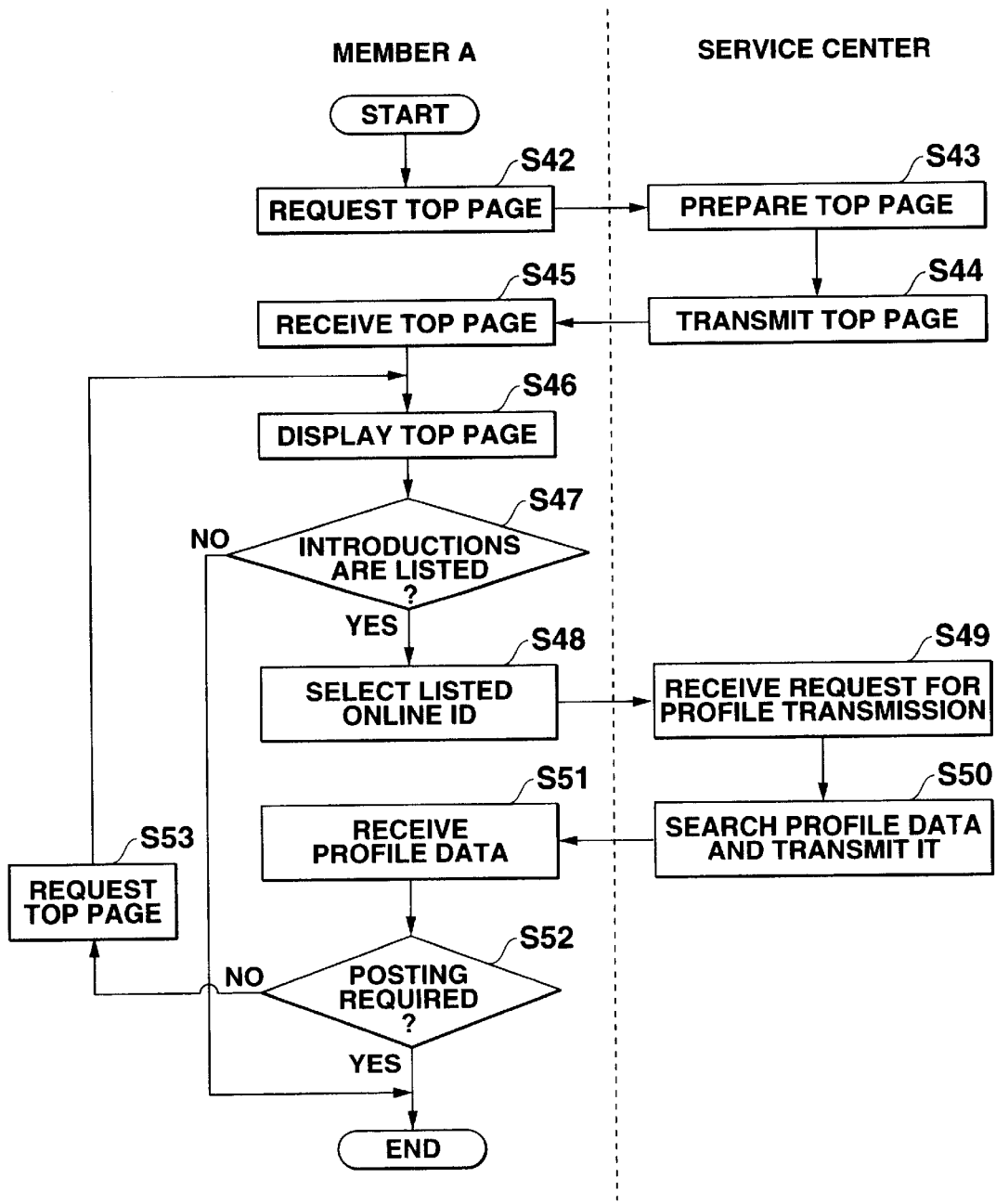
FIG. 24 is a flowchart for explaining a member introduction presenting process shown in FIG. 9.

In a case where the member A desires to post a message to the personal BBS of the member B at step S52 in FIG. 24, the member A requests the service center 3 to send a form page for inputting a message to be posted to the BBS of the member B (step S54).

In response to the request, the service center 3 prepares the form page for posting a message to the BBS of the member B (step S55), and transmits it to the member's terminal 2x of the member A (step S56).

The member's terminal 2x receives the form page form the service center 3, and displays it as shown in FIG. 12 (step S57). The member A fills in a message field on the form page (step S58), and requests the service center 3 to accept the posting to the BBS of the member B (step S59).

The service center 3 receives the form page in which the message to the member B input by the member A and the request for posting (step S60). And, the service center 3 transmits a user certification page to the member A to make him/her input his/her ID information in order to certify the user (step S61).

The member's terminal 2x of the member A receives the user certification page from the service center 3, and displays it. The member A fills in the input form with his/her member account and password (step S62), and transmits it to the service center 3 (step S63).

The service center 3 performs user certification based on the ID information given by the member A (step S64). The certification/charging server 7 accesses the charge information database 20 to obtain charged members' accounts corresponding to the member A (step S65). The database server 5 accesses the detailed personal profile database 15 to obtain introduced members' accounts corresponding to the member A (step S66). The WWW server 4 determines whether the charged members' accounts obtained at step S65 coincide with the introduced members' accounts obtained at step S66 (step S67). If no coincidence is found, the service center 3 transmits information representing payment notice to the member A (step S68).

The member's terminal 2x of the member A receives the payment notice from the service center 3, and displays a dialog box as shown in FIG. 13 (step S69). The member A determines whether payment is agreeable or not (step S70). If it is agreeable, the member A clicks a hypertext indication "YES". The members terminal 2x transmits a command signal indicating this action to the service center 3 (step S571).

In response to the command signal, the service center 3 updates the contents in the charge information database 20 (FIG. 8) (step S72). More precisely, the certification/charging server 7 counts up the charge counter corresponding to the member A by +1, and adds the member account of the member B to the charged member account field. The BBS server 6 writes the message which was input by the member A through the form page, to the personal BBS of the member B (step S73). Then, the database server 5 updates the BBS management information in the personal top page database 16 (FIG. 6C) so as to set the BBS positing flag of the member B to 1 (step S74). The service center 3 transmits information representing that the message was successfully posted, to the member A (step S75).

The member's terminal 2x of the member A receives the information from the service center 3, and displays it (step S76). Then, the BBS posting process at step S4 in FIG. 9 is terminated.

If it is determined at step S67 that the obtained charged members' accounts coincide with the obtained introduced members' accounts, the flow forwards to step S73. Or, if the user does not agree with the payment at step S70, the BBS posting process is terminated immediately.

The charge information update process at step S72 in FIG. 25 will now be described in detail.

After receiving the command signal representing that the member A agrees with the notice of payment, the certification/charging server 7 accesses the charge information database 20 to register the member account of the member B at the charged members' accounts field corresponding to the member A (step S78). The certification/charging server 7 further counts up the charging counter of the member A by 1 (step S79). The certification/charging server 7 also accesses the charge information database 20 to register the member account of the member A at the charged members' accounts field corresponding to the member B (step S80). Then, the charge information update process is terminated.

An outline of the replay preparation process at step S5 in FIG. 9 will now be described with reference to FIG. 28.

The member B executes the WWW browser in the member's terminal 2y, and accesses the service center 3 to request it to send the top page of the member B (step S81).

The service center 3 identifies that the request sender is the member B based on the Cookie information attached to the request. The database server 5 accesses the personal top page database 16 (FIG. 6C) to obtain top page information for the member B (step S82).

If introduction members' accounts have been set to the top page information of the member B, the database server 5 counts the number of the introduction members and prepares a message indicating the counted number, further sets online ID of the introduction members to the top page. Further, the database server 5 discriminates whether the BBS posting flag in the top page information for the member B is set 1 or not (step S83). If the flag is set to 1 which represents that any messages have been posted to the BBS of the member B, the database server 5 prepares an icon representing a bulletin board (a button or a hypertext indication may be applicable) to be displayed on the top page (step S84).

Then, the service center 3 transmits the top page information to the member's terminal 2y (step S85). If it is determined at step S83 that the BBS posting flag has been reset to 0 which represents that no messages has been posited to the BBS of the member B, the flow forwards to the step S85.

The member's terminal 2y receives the top page information from the service center 3, and displays the top page as shown in FIG. 14 (step S86). The member B discriminates whether the bulletin board icon is displayed on the top page or not (step S87). If no indication is shown, the member B may handle other arbitrary tasks (not shown). If the top page indicates the bulletin board icon, the member B clicks the bulletin board icon (step S88) to request the service center 3 to allow the member B to access his/her own BBS (step S89).

The service center 3 receives the request from the member B (step S90), and the database server 5 accesses the personal top page database 16 to reset the BBS positing flag of the member B to 0 (step S91). Then, the service center 3 requests the member B to send his/her ID information (step S92).

Figure 26:
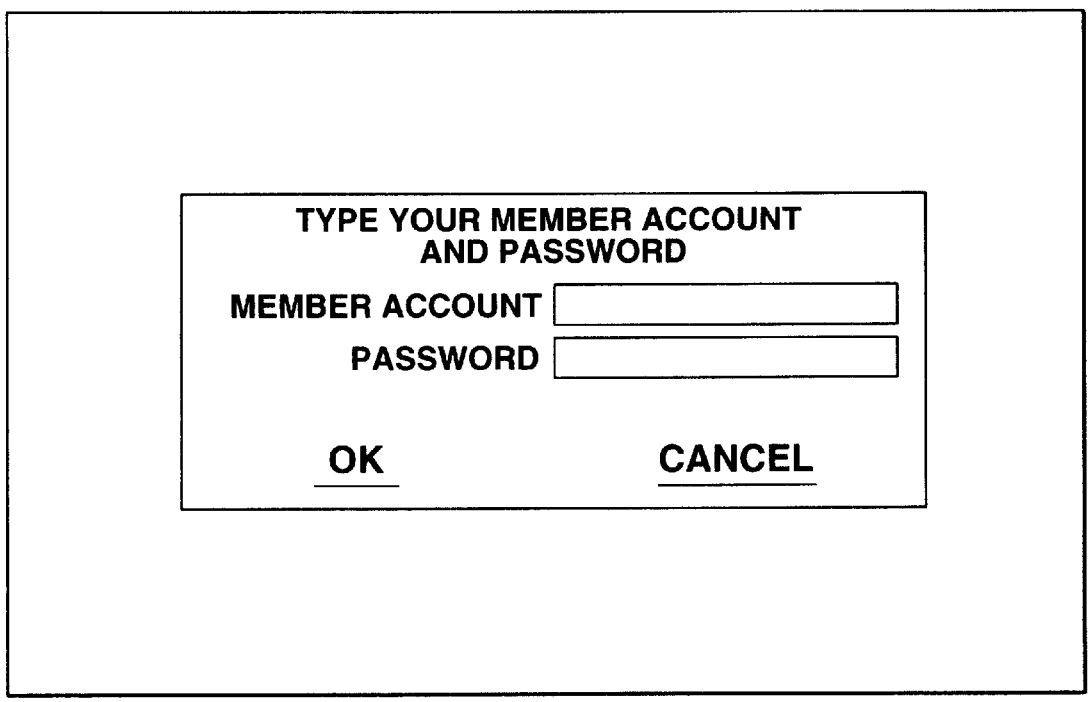
FIG. 26 is a diagram exemplifying an interface screen for inputting user certification information.
Figure 27:
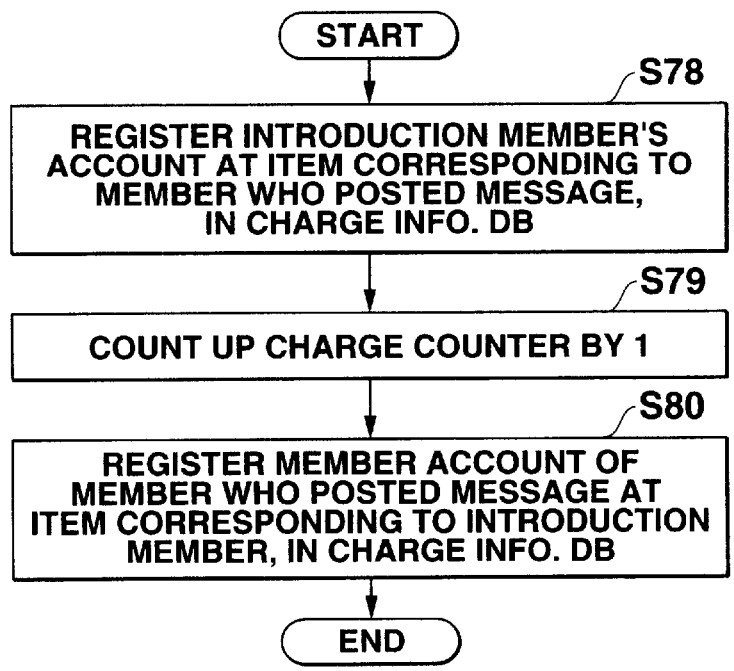
FIG. 27 is a flowchart for explaining a charge information update process.

In response to the request from the service center 3, the member's terminal 2y displays a text box page for inputting the user ID information as shown in FIG. 26. The member B inputs his/her member account and password through the text box (step S93) and transmits them to the service center 3 (step S94).

The service center 3 performs user certification based on the user ID information given by the member B (step S95). After the member B is certified, the BBS server 6 accesses the personal BBS database 18 to obtain BBS information for the member B, and the service center 3 transmits the obtained BBS information to the member B (step S96).

The member's terminal 2y receives the BBS information from the service center 3, and displays the BBS page of the member B as shown in FIG. 15 (step S97). FIG. 15 shows an example where the BBS page indicates the message posted by the member A. The member B refers the message and determine whether he/she will post a reply to the member A or not (step S98). If the member B wants to post a reply, he/she requests the service center 3 to send a profile page of the member A (step S99). In case of not replying to the message, the member's terminal 2y displays the top page again (step S87).

The service center 3 receives the request for the profile page (step S100). The WWW server 4 searches the open profile database 11 for the open profile information of the member A. The service center 3 transmits the open profile information to the member B (step S101). Simultaneously, the database server 5 accesses the detailed personal profile database 15 to register the member account of the member A at the introduced members' accounts field corresponding to the member B as shown in FIG. 6B.

The member's terminal 2y receives the open profile information of the member A, and displays the profile page of the member A as shown in FIG. 17 (step S102). The member B determines whether he/she will post a message to the BBS of the member A or not (step S103). If the decision is posting a message, the flow forwards to the next step. If posting is abandoned, the member terminal 2y displays the top page or the BBS page again (step S98).

Then, the reply preparation process at step S5 in FIG. 9 is terminated.

The process for posting a message at step S6 in FIG. 9 will now be described with reference to FIG. 29.

Figure 28:
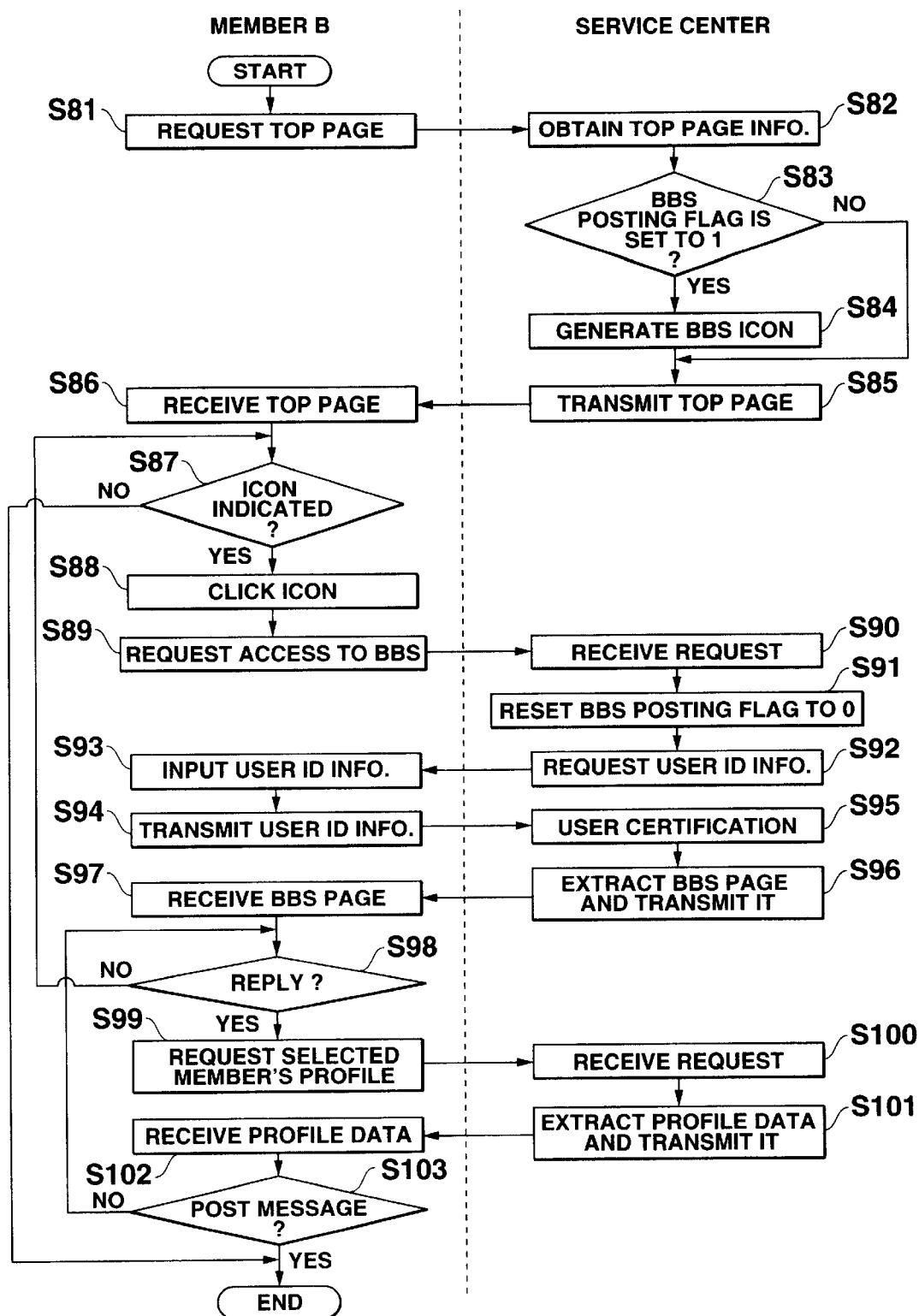
FIG. 28 is a flowchart for explaining a process shown in FIG. 9 for introducing members who bulletined messages to the user.
Figure 29:
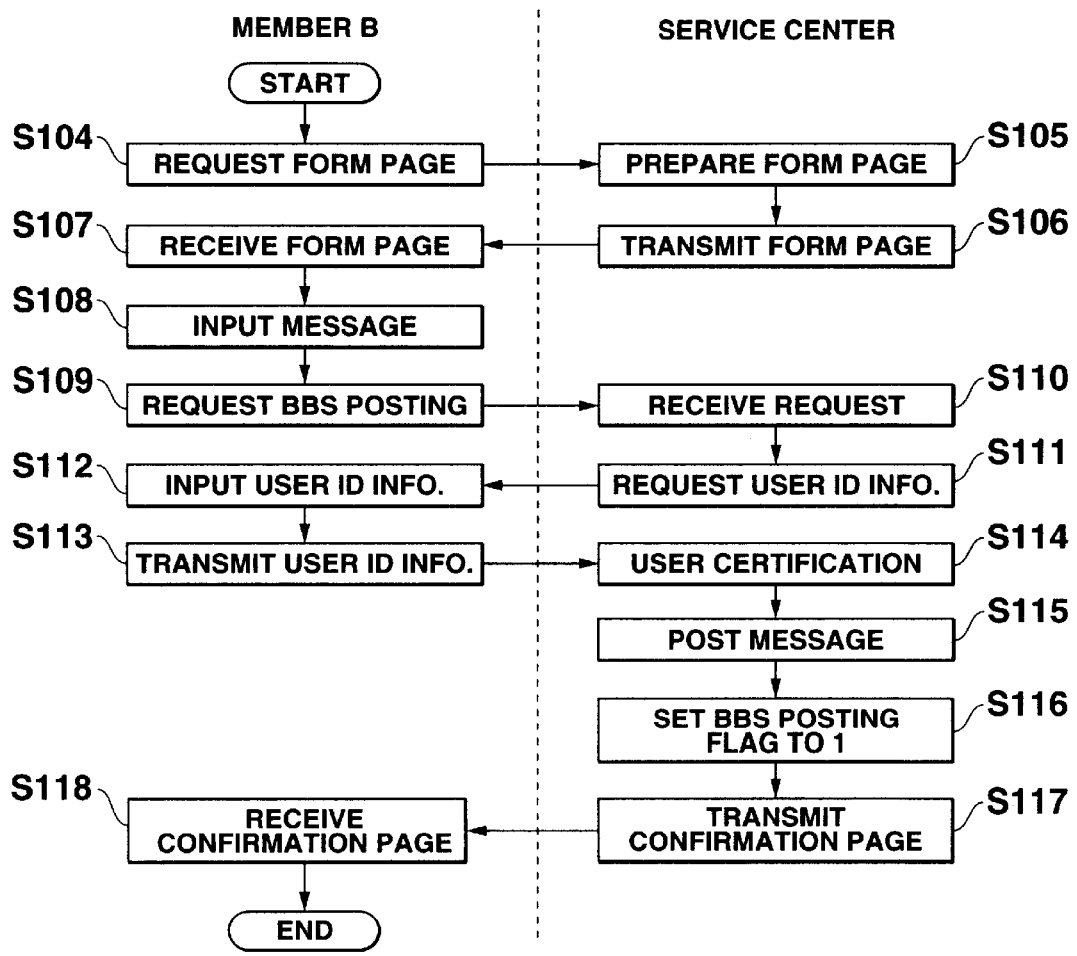
FIG. 29 is a flowchart for explaining a process shown in FIG. 9 for positing the personal BBS.

In a case where the member B decides to post a message for the member A at step S103 in FIG. 28, the member B requests the service center 3 to send a form page for inputting a message to be posted to the BBS of the member A (FIG. 29; step S104).

In response to the request, the service center 3 prepares the form page for inputting a message to be posited to the BBS of the member A (step S105), and transmits it to the member B (step S106).

The member's terminal 2y receives the form page from the service center 3, and displays it as shown in FIG. 17 (step S107). The member B fills in a message field on the form page (step S108), and requests the service center 3 to accept the message posted to the BBS of the member A (step S109).

The service center 3 receives the filled-in form page and the request (step S1 10). The service center 3 requests the member B to send user ID necessary for user certification (step S111).

In response to the request from the service center 3, the member's terminal 2y displays a text box page for inputting the user ID as shown in FIG. 26. The member B inputs his/her member account and password through the text box page (step S112), and transmits the user ID to the service center 3 (step S113).

The service center 3 performs user certification based on the received user ID given by the member B (step S114). If the member B is certified successfully, the service center 3 writes the received message input by the member B on the BBS of the member A (step S115). Then, the database server 5 accesses the personal top page database 16 to update the BBS management information by setting the BBS posting flag of the member A to 1 (step S116). The service center 3 transmits information representing that the message was successfully posted, to the member B (step S117).

The member's terminal 2y receives the information from the service center 3, and displays a predetermined page of the received information which represents that the message was posted successfully (step S118). Then, the process for positing a message to the BBS at step S6 in FIG. 9 is terminated.

The process of referring a reply at step S7 in FIG. 9 will now be described with reference to FIG. 30.

The member A operates the member's terminal 2x to execute the WWW browser for accessing the service center 3 in order to request it to send the top page of the member A (step S119).

The service center 3 identifies the member A based on Cookie information supplied by the WWW browser of the member's terminal 2y, and the database server 5 accesses the personal top page database 16 (FIG. 6C) to obtain the top page information of the member A (step S120). The database server 5 discriminates whether the BBS posting flag in the obtained top page information is 1 or not (step S121). In a case where the flag is set to 1 which represents that any messages have been posted to the BBS of the member A, the database server 5 prepares the bulletin board icon on the top page of the member A (step S122). The service center 3 transmits the top page to the member A (step S123). If it is discriminated at step S121 that the BBS flag is reset to 0 which represents no message has been posted to the BBS of the member A, the flow directly forwards to step S123.

The member's terminal 2x of the member A receives the top page information from the service center 3, and displays the top page as shown in FIG. 31 (step S124). The member A confirms whether the top page has the bulletin board icon or not (step S125). If no bulletin board icon is displayed, the process for referring a reply is terminated. In case of the bulletin board icon indication, the member A clicks the bulletin board icon (step S126) to request the service center 3 to allow him/her to access his/her BBS (step S127).

The service center 3 receives the request from the member A (step S128). The database server 5 accesses the personal top page database 16 to reset the BBS positing flag of the member A to 0 (step S129). Then, the service center 3 requests the member A to send the user ID information (step 130).

In response to the request from the service center 3, the member's terminal 2x of the member A displays the text box page for inputting the user ID as shown in FIG. 26. The member A inputs his/her member account and password through the text box page (step S131), and transmits the user ID to the service center (step S132).

The service center 3 performs user certification based on the user ID given by the member A (step S133). After the member A is certified successfully, the BBS server 6 assesses the personal BBS database 18 to obtain the BBS information of the member A, and the service center 3 transmits it to the member A (step S134).

The member's terminals 2x of the member A receives the BBS information from the service center 3, and displays the personal BBS page of the member A as shown in FIG. 18 (step S135). The BBS page has the message which was posted by the member B. The member A decides to post a reply or not (step S136). In a case where the posting a reply is abandoned, the member's terminal 2x displays the top page again (step S125). In case of posting a reply, the flow forwards to the next step.

Thus, thee process for referring a reply at step S7 in FIG. 9 is completed.

The process for posting a message to the BBS at step S8 in FIG. 9 will now be described.

Figure 30:
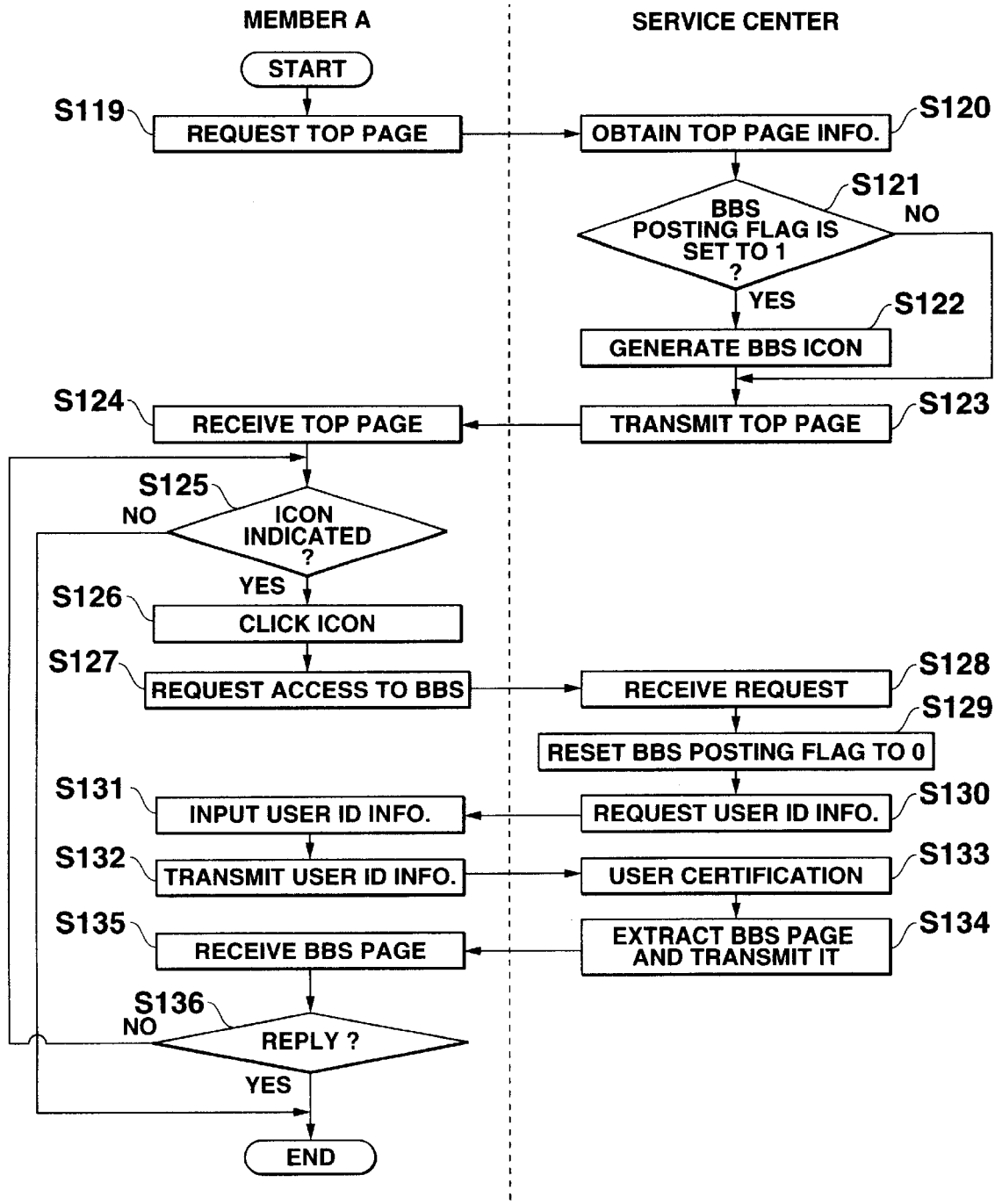
FIG. 30 is a flowchart for explaining a process shown in FIG. 9 for introducing members who bulletined messages to a user.

In a case there the member A decided at step S136 in FIG. 30 to post a message to the BBS of the member B, the member A clicks a reply icon displayed on the BBS page of the member A shown in FIG. 18. Steps after clicking the reply icon are the same as the aforementioned steps for positing a message.

The certification/charging server 7 constantly (for example, at every month ends) accesses the charge information database 20 (FIG. 8) to check the contents, and charges the members in accordance with values of the charge counter.

As described above, once a user is registered as a member of information exchanging service according to this embodiment, the user can find folks matching with the user's search options and can establish one-to-one communication with the found folks. Moreover, the user is charged only when he/she posts a message to the BBS of an introduction (s). Therefore, the user is not charged when no introduction is found or the user does not post a message to an introduction(s). Further, the user is charged only when he/she posts a message to the BBS of an introduction(s) first time. In other words, the user is not charged when he/she posts a rely and posts messages to the introduction(s) after second time. Therefore, the user can enjoy communication without warrying about payment.

Various modifications and changes may be made thereunto without departing from the broad spirit and scope of the invention.

The above embodiment exemplifies a case of exchanging messages via the BBS. The present invention may be applicable to, for example, a case of exchanging messages by e-mails. In this case, for example, each member has rental mail box. A user to whom another member is introduced, is charged when he/she send an e-mail to the introduction.

In the above embodiment, the user to whom another member is introduced is charged when he/she posts a message to the BBS of the introduction first time. The present invention may employ various charging techniques and flexibly settable charging timing. For example, the system may charge the user for profile reference. The system may employ charging technique which charges, for example, only male members.

The charging technique which charges both a searcher member and an introduction (the member A and the member B in the above embodiment) may also be applicable.

In this case, for example, a searcher member and an introduction member are charged when communication therebetween is established. For example, in a case where the member B is introduced to the member A by the service center 3, the members A and B are charged only when the member A send a message to the member B and the member B replies to the message. In this case, for example, a sent flag is prepared in the charge information database 20. When the member A opens the open profile page of the member B, clicks "MESSAGE" to obtain a form page for inputting a message to the member B, and clicks "POST" (step S4003 in FIG. 9, step S59 in FIG. 25, etc.), the sent flag for the member A is set thus indicating that the message is sent to the member B from the member A.

When the member by refers to the message from the member A and the open profile page of the member A, and sends a message to the member A (step S6003 in FIG. 9 and step S109 in FIG. 29), the service center 3 confirms whether the sent flag for the member A in the charge information database 20. The service center 3 discriminates whether the sent flag indicating that the message has been sent to the member B from the member A is set or not. The service center 3 executes charging process in a case where it is discriminated that the flag has been set. Then, the service center 3 deletes the sent flag, and adds the member account of the member B to the charged member's accounts field for the member A in the charge information database 20, while adding the member account of the member A to the charged member's accounts field for the member B in the charge information database 20.

Each time the member A transmits a message to the member B, the charged member's accounts information for the member B is referred, and vice versa, however, both the member A and the member B are not charged because the member A's member account has been set to the charged member's accounts information for the member B, while the member B's member account has also been set to the charged member's accounts information for the member B. The charging technique by which both member A and member B are charged may be applicable to this case.

Figure 32:
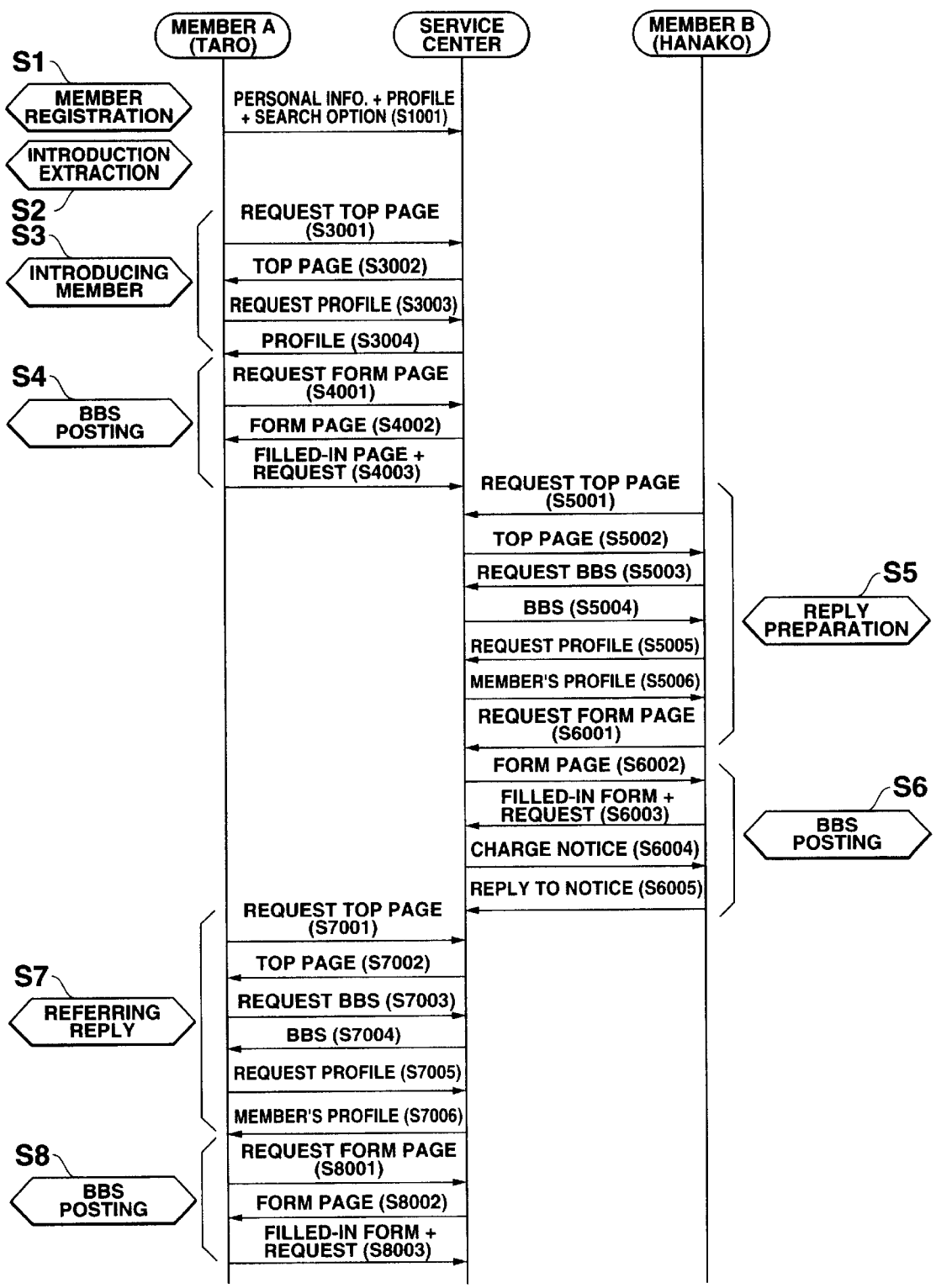
FIG. 32 is a diagram for explaining a modified charging process.

FIG. 32 is a timing chart similar to FIG. 9 for explaining the above charging process. This timing chart is basically the same as that shown in FIG. 9. However, the process for posting a massage by the member A (step S4) does not includes the payment warning process (step S4004) and the process for replying to the payment warning (step S4005), while the process for posting a message by the member B (step S6) includes a payment warning process (step S6004) and a process for replying to the payment warning (step. S6005).

The sent flag may be stored together with time stamp in order to delete the sent flag after a predetermined time period lapses (for example, 1 month).

The system may employ an arbitrary technique for controlling the charging process (discrimination whether uncharged or charged and various control tasks). The method is not limited to the above describe example, and various modifications and changes may be made thereunto.

For example, charging timing is not required to be synchronous with transmission or writing of a message. In this specification, an expression that the user is charged when transmission or writing includes a situation where the charging process is executed at timing which satisfies predetermined condition in response to the transmission or writing a message as another condition.

Introductions may be extracted and introduced in repose to a request given by the members, instead of constant extraction and introducing exemplified in the above embodiment. In this case, an icon (a button or a hypertext indication may be applicable) representing a request for introducing is prepared on the members' top pages (FIGS. 10, 14, 31). In response to clicking the icon, a command signal representing the request is sent to the service center 3, and the service center 3 executes extraction/introducing process (steps S31 to S39 in FIG. 23) for the member who sent the request. According to this method, the process will be streamlined because introducing an introduction is carried out at desired timing of each member.

In the above embodiment, the user is charged when he/she is informed of an introduction or posts a message. The present invention may be applicable to a case for providing free service. In this case, systems and steps for informing a user of payment warning, determining whether the user agrees with the payment, and charging the user are omitted. In FIG. 3, for example, a message to be posted to the BBS of the member B may be written without performing the charging process at step Q6.

A full or piece of a program to be executed by a computer or computers to work as the service center 3 may be stored in a recording medium such as CD-ROM, hard disk, and MO for distribution.

According to the present invention as described above, the system extracts an introduction based on attribute information of each member, and introduce an appropriate introduction to a searcher member. The system also intermediates information exchanges between the searcher member and the introduction with charging them for intermediating the information, as needed.

What is claimed is:

1. A system for intermediating messages comprising:
   a database which stores attribute information of a plurality of members;
   a member extraction unit which extracts members to be introduced to another member based on the attribute information stored in said database;
   a member introducing unit which introduces the member extracted by said member extraction unit to a target member;
   an intermediate unit which intermediates messages between the target member and the introduced member, the intermediate unit comprising:
   an electronic bulletin board storage unit which stores electronic bulletin boards prepared for each member;
   a message posting unit which posts a message to the bulletin board of the member introduced by said member introducing unit in response to a request from the target member; and
   a message presenting unit which presents the message posted to the bulletin board of the introduced member in response to a request from the member concerned;
   a web page storage unit which stores web pages each showing profile data of each member;
   a message storage unit which stores messages posted to the members;
   a web page providing unit which provides each member with a web page on which a list indicating extracted members to be introduced, and a message arrival indicator item representing that messages from the other members have arrived;
   a web page read unit which reads out the web page showing profile data of the introduced member from said web page storage unit in response to selecting the introduced member from the list on the web page of the target member, and provides the target member with the read-out profile web page;
   a message read unit which reads out messages posted to the target member from said message storage unit in response to selecting the message arrival indicator item, and provides the target member with the read-out messages;
   a form providing unit which provides a form page for inputting and transmitting the message in response to selecting the request transmission item;
   a charge unit which carries out charging; and
   a charging execution unit which activates said charge unit while storing the message from the member on said message storage unit;
   wherein each of the web pages for showing the profile data of the members has a request transmission item for transmitting a request for transmitting a message.

2. A system for intermediating messages comprising:
   a database which stores attribute information of a plurality of members;
   a member extraction unit which extracts members to be introduced to another member based on the attribute information stored in said database;
   a member introducing unit which introduces the member extracted by said member extraction unit to a target member;
   an intermediate unit which intermediates messages between the target member and the introduced member; the intermediate unit comprising:
   an electronic bulletin board storage unit which stores electronic bulletin boards prepared for each member;
   a message posting unit which posts a message to the bulletin board of the member introduced by said member introducing unit in response to a request from the target member; and
   a message presenting unit which presents-the message posted to the bulletin board of the introduced member in response to a request from the member concerned;
   a web page storage unit which stores web pages each showing profile data of each member;
   a message storage unit which stores messages posted to the members;
   a web page providing unit which provides each member with a web sage on which a list indicating extracted members to be introduced, and a message arrival indicator item representing that messages from the other members have arrived;
   a web page read unit which reads out the web sage showing profile data of the introduced member from said web page storage unit in response to selecting the introduced member from the list on the web sage of the target member, and provides the target member with the read-out profile web sage;
   a message read unit which reads out messages posted to the target member from said message storage unit in response to selecting the message arrival indicator item, and Provides the target member with the read-out messages;

a first form providing unit which provides a form page for inputting and transmitting a message to the introduced member, in response to selecting the selective indication;

a first storage control unit which receives a message inputted through the form page from the target member, and stores the received message-on a first message memory prepared for the destination member;

a second form providing unit which provides a form page for inputting and transmitting a reply message to the message stored in said first message memory, in response to a request given by the member who received the message; and a second storage-control unit which receives the reply message inputted through the form page provided by said second form providing unit, and stores the received reply message on a second message memory;

wherein each of the web sages for showing the profile data of the members has a request transmission item for transmitting a request for transmitting a message.

3. A system for intermediating messages comprising:

a database which stores attribute information of a plurality of members;

a member extraction unit which extracts members to be introduced to another member based on the attribute information stored in said database;

a member introducing unit which introduces the member extracted by said member extraction unit to a target member;

an intermediate unit which intermediates messages between the target member and the introduced member, the intermediate unit comprising:

an electronic bulletin board storage-unit which stores electronic bulletin boards prepared for each member;

a message posting unit which posts a message to the bulletin board of the member introduced by said member introducing unit in response to a request from the target member; and a message presenting unit which presents the message posted to the bulletin board of the introduced member in response to a request from the member concerned;

a web page storage unit which stores web pages each showing profile data of each member;

a message storage unit which stores messages posted to the members;

a web page providing unit which provides each member with a web page on which a list indicating extracted members to be introduced, and a message arrival indicator item representing that messages from the other members have arrived;

a web sage read unit which reads out the web page showing profile data of the introduced member from said web page storage unit in response to selecting the introduced member from the list on the web page of the target member, and provides the target member with the read-out profile web page;

a message read unit which reads out messages posted to the target member from said message storage unit in response to selecting the message arrival indicator item, and provides the target member with the read-out messages; and a charge unit which carries out charging when said second storage control unit stores the reply message on said second message memory.

* * * * *